(12) United States Patent
Sun

(10) Patent No.: US 10,224,718 B2
(45) Date of Patent: Mar. 5, 2019

(54) TRANSIENT IMPEDANCE TRANSFORMER BASED ON AC VOLTAGE REGULATING ELECTRONIC SWITCH

(71) Applicant: Chongshan Sun, Heilongjiang (CN)

(72) Inventor: Chongshan Sun, Heilongjiang (CN)

(*) Notice: Subject to any disclaimer, the term of this patent is extended or adjusted under 35 U.S.C. 154(b) by 235 days.

(21) Appl. No.: 15/113,990

(22) PCT Filed: Jan. 25, 2014

(86) PCT No.: PCT/CN2014/071434
§ 371 (c)(1),
(2) Date: Jul. 25, 2016

(87) PCT Pub. No.: WO2015/109551
PCT Pub. Date: Jul. 30, 2015

(65) Prior Publication Data
US 2016/0359326 A1    Dec. 8, 2016

(30) Foreign Application Priority Data
Jan. 25, 2014   (CN) .......................... 2014 1 0034576

(51) Int. Cl.
*H02J 3/18*    (2006.01)
*H02J 50/10*   (2016.01)
*H02J 3/10*    (2006.01)

(52) U.S. Cl.
CPC .............. *H02J 3/1878* (2013.01); *H02J 3/10* (2013.01); *H02J 50/10* (2016.02); *Y02E 40/30* (2013.01)

(58) Field of Classification Search
CPC .................................................. H02J 3/1878
See application file for complete search history.

(56) References Cited

U.S. PATENT DOCUMENTS 6,020,726 A * 2/2000 James .................. H02J 3/1814
                                                  323/239
2003/0043596 A1  3/2003 Pai et al.

FOREIGN PATENT DOCUMENTS

CN    101581946    11/2009
CN    101968995    2/2011
(Continued)

OTHER PUBLICATIONS

Office Action dated Aug. 15, 2017 and English translation from corresponding application No. JP 2016-565528.
(Continued)

*Primary Examiner* — Daniel Puentes
(74) *Attorney, Agent, or Firm* — Hauptman Ham, LLP

(57) ABSTRACT

A superposition principle of waveform based on conceptions of waveform continuity and flexible regulation of voltage proposes three concepts, respectively being flexible AC transformation, flexible power transmission and transformation and flexible voltage regulation; proposes three new technologies, respectively being a transient impedance technology, a flexible stepless voltage regulation technology and a flexible stepped voltage regulation technology; proposes three new products, being an AC voltage regulating electronic switch, a transient impedance transformer and a high-speed voltage regulating transformer; proposes six high-voltage power grid connection methods, being a power grid connection method type of a transient impedance transformer, a power grid connection method of a transient impedance step up auto transformer and the like; and proposes a new reactive compensation connection method for a reactive compensation device.

13 Claims, 6 Drawing Sheets

(56) References Cited

FOREIGN PATENT DOCUMENTS

| CN | 201984364 | 9/2011 |
|---|---|---|
| CN | 103311937 | 9/2013 |
| DE | 102011116329 | 4/2013 |
| KR | 20040081414 | 9/2004 |
| KR | 100501486 | 7/2005 |

OTHER PUBLICATIONS

Extended European Search Report dated Sep. 7, 2017 from corresponding application No. EP14879717.8.
International search report dated Oct. 28, 2014 from corresponding No. PCT/CN2014/071434.
You-hua Jiang et al., "Application of Electrical and Electronic Techniques in on-load Tap-changing Transformer", Electric Power Construction, vol. 27, No. 12, Dec. 2006, pp. 75-77. English Abstract is on p. 1.
Office Action dated Jun. 3, 2015 from corresponding No. CN 201410034576.X.
Office Action dated Nov. 3, 2015 from corresponding No. CN 201410034576.X.
Allowed Documents dated Jan. 14, 2016 from corresponding No. CN 201410034576.X.

\* cited by examiner

TRANSIENT IMPEDANCE TRANSFORMER BASED ON AC VOLTAGE REGULATING ELECTRONIC SWITCH

RELATED APPLICATIONS

The present application is a National Phase of International Application Number PCT/CN2014/071434, filed Jan. 25, 2014, and claims the priority of China Application No. 201410034576.X, filed Jan. 25, 2014, which are incorporated herein by reference in their entireties.

FIELD OF THE INVENTION

The present invention specifically describes a development of conceptions, and proposes three concepts, three new technologies, three new products, six high-voltage power grid connection methods, a new type of reactive compensation connection method, proposes a new solution to usage of AC voltage regulator. The present invention relates to the technical fields of power electronics, transformer, high voltage or ultra-high voltage power grid transmissions, stepless voltage regulation technology, reactive compensation technology.

The above development of the conceptions direct to a superposition principle of waveform based on conceptions of waveform continuity and flexible regulation of voltage.

The above three concepts respectively are flexible AC transformation, flexible power transmission and transformation and flexible voltage regulation.

The above three new technologies respectively are a transient impedance technology, a flexible stepless voltage regulation technology and a flexible stepped voltage regulation technology.

The above three new products are: an AC voltage regulating electronic switch, a transient impedance transformer and a high-speed voltage regulating transformer.

The six high-voltage power grid connection methods are: a power grid connection method of a transient impedance transformer, a power grid connection method of a transient impedance transformer with split windings, a power grid connection method of a transient impedance step up auto transformer, a power grid connection method of a transient impedance step up auto transformer with split windings, a power grid connection method of a high-speed voltage regulation step down auto transformer and a power grid connection method of a high-speed voltage regulating step down auto transformer with split windings, etc.

When a new reactive compensation connection method is used for reactive compensation, a reactive compensation device may be connected with a terminal of a secondary outgoing wire of a main transformer of a series voltage regulating transformer in series or in parallel.

Eight basic single phase switch are included in the AC voltage regulating electronic switch of the above three new products: a new AC voltage regulator, a linear regulating switch, a reversing change-over switch, a coarse-fine regulating switch, an intermediate regulating switch (2 types), an end portion regulating switch and a neutral point voltage regulating switch, etc., which are flexibly combined when working in three phases situation.

A power transformer, a special transformer and a voltage regulator type transient impedance transformer, etc., are derived from the transient impedance transformer of the above three new products, which relate to different technical fields, and 17 types of transformer are summarized herein. The 17 types of transformers are: a transient impedances power transformer, a transient impedances power transformer with split windings, a transient impedance step up power auto transformer, a transient impedance step up power auto transformer with split windings, a high-speed voltage regulating step down power auto transformer, a high-speed voltage regulating step down power auto transformer with split windings, a transient impedance converting transformer, a high speed voltage regulating step down auto transformer, a transient impedance electric furnace auto transformer, a high-speed voltage regulating electric furnace auto transformer, a transient impedance traction transformer, a transient impedance power source transformer, a transient impedance step up power source auto transformer, a high-speed voltage regulating step down power source auto transformer, a transient impedance voltage regulator, a transient impedance step up auto voltage regulator, a high-speed voltage regulating step down auto voltage regulator, etc.

BACKGROUND ART

Background technology of an AC voltage regulator is that two semiconductor elements (such as, thyristors, hereinafter using thyristor as semiconductor elements) are connected in an AC circuitry in series after connected in anti-parallel, and AC output may be controlled by controlling the thyristors or other power electronic components. This circuit, which does not change the frequency of alternating current, is termed as an alternating current control circuit. The single/three-phase circuitry constituted by the control circuit is an AC voltage regulator. That is, a control device constituted by the semiconductor elements for converting an alternating current into another alternating current with the same frequency and different voltages.

Background technology of a transformer switch is that the voltage regulation is performed on transformer in voltage in order to supply stable voltage through the power grid, and control the current flow or regulate the load current. At present, the method for voltage regulation on transformer is a stepped voltage regulation method which is performed by disposing tap switch on the coil at one side thereof, so as to increase or decrease wire turns, achieving the for changing voltage ratio. Such a circuitry for regulating voltage by coil tap is termed as a voltage regulating circuit. The component for changing tap to regulate voltage is termed as a tap switch. The voltage regulating in which the secondary winding applied with no load and the primary winding disconnected with the power grid is termed as a non-excitation voltage regulating, and the voltage regulating applied with a load for changing coil tap is termed as an on-load voltage regulating. Consequently, the transformer switch is classified into two types, namely, a non-excitation tap switch, and a loaded switch. The insulation level of the loaded switch is determined by the max ground potential of the voltage regulating coil under a surge voltage, and total insulation is determined by the shock gradient of the voltage regulating coil under a surge voltage. As the level of insulation and the offset voltage are high, the switching capacitor discharges.

Background technology of a conventional series voltage regulating transformer is that, in low-voltage and high-current system application, the series voltage regulating transformer is constituted by two transformers, one for main transformer (constant at low voltage side), and another for series voltage regulating transformer (adjustable at low voltage side). A single voltage regulating winding provided on the main transformer is required for supplying power to series high voltage side. The low-voltage windings of main and series transformers are connected together in series and utilize a splayed coil structure, the voltage of low voltage windings of main transformer are constant, and the voltage of low voltage windings of series transformer are adjustable, so that the voltage of the two serially coupled low voltage windings are changed, thereby changing the synthetic voltage of the two low voltage windings. The main transformer comprises a high voltage winding, a low voltage winding, and a voltage regulating winding. The series transformer comprises a high voltage winding and a low voltage winding which are used in low-voltage and high-current system application.

Background technology of high voltage or ultra-high voltage AC power transmission system is that: the ultra-high voltage power transmission system is a new power transmission method for transmitting greater power to further distance than 500 KV AC power transmission method. It includes AC ultra-high voltage (UHV) and high voltage direct current (HVDC), and has the following advantages: cheap transmission costs, simple power grid structure, small short-circuit current, less transmission corridors occupation and improved power supply quality, etc. AC ultra voltage represents for a voltage higher than 1000 kV as defined by the International Electrotechnical Commission. In China, the ultra voltage represents for 1000 kV or more AC power, or 800 kV or more DC power. UHV AC transmission has disadvantages of higher voltage, long transmission lines, large distribution capacity, small wave impedance, obvious fault wave process. Even though the UHV transmission lines are typically mounted with paralleling reactor so as to compensate charge current of transmission lines, and suppress the occurrence of overvoltage, as well as decrease transmission capacity of the transmission lines, which is opposite to the fundamental purpose of UHV power transmission.

The main advantages for utilizing high voltage or ultra-high voltage AC power transmission is as follows: (1) improved transmission capacity and transmission distance; (2) improved economical efficiency for power transmission, wherein higher power transmission voltage means cheaper transmission capacity per unit; (3) saved floor space of the corridors for transmission and floor space for transformer substation; (4) reduced power loss for transmission line; (5) convenience for networking, simplified network topography, decreased failure rate.

Background technology of high voltage DC power transmission system: with development of power electronic technology, DC high-voltage power transmission becomes feasible, and is possible to become fully effective in all its aspects. At present, almost over 80 high voltage DC power transmission projects have been put into operation all over the world. In China, more than 10 high voltage DC power transmission projects are utilized in the national electricity grid, which play an important role in optimizing energy configuration, guaranteeing national energy security, and promoting national economic development. With the implementation of the Chinese national strategic guidelines, such as, "Western Power to the East, North and South to Share Power, National-link Network", it has become a tendency to accelerate the construction of millions volts level of AC and ±660 kV, ±800 kV, ±1000 kV level of DC system UHV power grid as a centre power grid architecture. The concept of high voltage DC power transmission is a way of power transmission that the AC power generated by power plants is changed into DC power by rectifiers to be transmitted to receiving ends, and is changed into AC power by inverters to be transmitted to receiving ends. This way of transmission is mainly utilized in long-distance and high-power power transmission and networking of networking of nonsynchronous AC systems, has lower transmission line costs in economy, and lower power loss per year.

There are lots of advantages of DC power transmission in technology, firstly, the problem of system stability does not exist, and nonsynchronous interconnection in the power grid may be possible, while in the AC power system, the entire synchronous generator in the AC power system keep synchronized. The transmission capacity and distance in DC power transmission are not influenced by stability of synchronized operation, and may be connected to two systems with different frequencies, thereby achieving nonsynchronous networking and improving stability of the system. Secondly, the DC power transmission has limit on short-circuit current. If the AC power transmission line is used for connecting two AC systems, the capacity of short circuit is increased, and even a circuitry breaker is required to be replaced or a current-limiting device is required to be added. However, when the DC power transmission line is used for connecting two AC systems, the "constant current control" of the DC system limits the short-circuit current near rated power, and thus the capacity of short circuit is not increased due to interconnection. Moreover, the regulation is very fast, and operation thereof is reliable. The DC power transmission may rapidly adjust the active power through silicon controlled rectifier converters to achieve "current tipping" (change of flow direction of the power). In DC power transmission, under normal condition, stable output is ensured. When a failure is occurred, urgent support to fault systems by sane systems is achieved, and suppression on oscillating damping and sub-synchronous oscillation may be achieved. When the AC/DC lines run in a manner of paralleling operation, if the AC transmission lines short out, the DC transmitting power may be increased briefly to decrease the acceleration of the rotor of the generator, thereby improving the reliability of the system. Thirdly, there is no capacitor charging current. Under steady state of the DC transmission line, there is no capacitance charging current, the following voltage is stable, and when there is no idle load or light load, abnormal incensement in voltage is observed at the AC long line-receiving end and mediate portion, and there is no need for connecting reactance in parallel to compensate. Furthermore, the floor space of the corridors is saved.

Background technology of electrochemically electrolytic system: in a electrochemical electrolytic system, the electrolytic current is required to maintain constant to ensure stability of the electrolysis bath thermal scheme and improvement of current efficiency, so as to relief labor intensity of the workers, and there is great advantage to reduce anode effect of aluminum electrolysis. If the electrolytic current is larger or smaller than rated value for a long time, then the thermal equilibrium in the electrolysis bath may be broken, so that the bath is overheated or subcooled to influence production and yield. The existing electrolytic silicon rectifier units are not silicon controlled units due to power factors, and barely provided with saturated reactor. And even it was provided, the units have small modulation range in view of economy. Those rectifier units without saturated reactor have power factors up to 0.94. Thus, the regulation of DC output voltage is mainly based on loaded tap switches in the transformer. However, the loaded tap switches have slow operation speed, and thus may not amend momentary fluctuation of the electrolytic current, such as, when anode effect occurs in aluminum electrolysis (depend on the difference line voltages, line current may be decreased by 5-10% which lasts for several minutes). If the tap switches are utilized for elevating voltage to maintain the series current, when the anode effect does not exist, current impact will occur due to lower operation speed of the tap switches. Thus, this transitory variation of current is typically not regulated. In addition, in order to reduce the times of operation for the loaded tap switches, it is impossible to respond to transitory variation of current. The operations of loaded voltage regulation switches are very frequent. There are at least 36000 times based on 100 times per switch each day, and the tap switches are required to be maintained once per 3000 times, which means long repair cycle, and has a strong impact on production. Thus, it is very important to reduce frequent operation of the loaded voltage regulation switch and prolong its service life. Thus, a constant current control scheme of rapid self-regulation which is turned off or on upon anode effect is typically not utilized in aluminum electrolysis, in order to reduce frequent operation of loaded tap switch, and the voltage fluctuation with time of duration less than 2 minutes causes frequent operation of loaded tap switch.

It is also very important to obtain a high-precision, long-life and high-speed current regulating system. In the field of electrolytic producing, yield is directly related to ampere-hour, and various process indexes are closely related to average current. In this case, it is desirable to obtain an automatic high-speed current stabilizer capable of maintaining the error of average current or ampere-hour less than 0.25% to 0.1% in several hours. However, it is very difficult to achieve the above accuracy only by utilizing the loaded tap switches in the system. The operations of the loaded tap switches are very slow with respect to the response for current modulation system. Typically, there is no response to variation of current within 10% lasting for several minutes, and there must be transient response to large variation of current exceeding normal range of operation. However, the variation time for voltage regulation of the loaded switch is 10 s to 20 s, when the range of voltage regulation is large, the response time will fail to follow up with the variation time of current.

Background technology of electric furnace smelting: the smelting process of electric furnace is divided into two processes, i.e., a melting period and a refining period. In the melting period, the cover is sealed and three-phase electrodes are connected after steel scrap is loaded. After the three-phase power is turned on, large-current arc is generated between the electrodes and the steel scrap, and the steel scrap is melt due to heat of the arc. Compared with the arc of the melting period, the arc in the refining period is relatively stable, the current is basically constant, and at this time, the voltage variability and flicker effect are exceedingly small.

Typically, the smelting period of AC arc furnace is about 1 h to 3 h, and the supplied voltage is 110 KV or 35 KV. When a specially designed arc furnace transformer is powered, the voltage between secondary side electrodes is typically between 100V to 700V, wherein the voltage drops of the electrodes are about 40V, the arc drop is about 12V/cm, and the longer the arc, the larger the voltage drop. The current control of arc furnaces is achieved by switch between taps of high-voltage side winding of the transformer of the arc furnace and regulation of electrode voltage, i.e., the furnace transformer defines a value for input arc voltage by using a switch, and three-phase graphite electrodes are controlled to insert into the furnace, and the lifting device of the electrodes is controlled to move up and down, the input power of the furnace is controlled, thereby controlling the arc current in the furnace. The arc furnace consumes large reactive power, and has a large variation. In the melting period, due to direct arc between steel scrap and electrodes, as the steel scrap melts, the length of the arc will certainly change, thereby causing movement of the arcing points, and the electrode controlling system cannot follow up with saltatory variation of the arc and cannot compensate timely due to mechanical inertia response time within several seconds to ten or more seconds, and thus the arc is not stable. At the beginning of the melting period, as the temperature in the furnace is lower, the arc is hard to be maintained, and is not stable frequently, and thus the current is discontinuous. In order to maintain the arc stable, the power factor of the arc furnace is not high, and sudden variation of the current will cause concurrent and sudden variation of the active power and reactive power extracted by the arc furnace from the power supply system, i.e., in the process of smelting in the arc furnace, the arc current is rapidly changed by a large margin. Since the electric arc furnace is a high inductive load, when the high-power arc furnace operates in melting period, the power factor is even lowered to 0.1 to 0.2, which causes serious fall in bus bar voltage. When voltage is reduced, and active power of the electric-arc furnace is decreased correspondingly, the molting period is prolonged, and the productivity is decreased. The power factor of the arc furnace is 0.1 to 0.2 when the electrode is shorted out, and is 0.7 to 0.85 under rated operation. As the melting proceeds, the electrode voltages are decreased, scrap is melted from the lower portion. After the lower scrap is melted, the upper part of the steel block fall down, causing sudden two-phase short-circuit of electrode ends, and thus the arc current will change sharply by a large margin. Variation of arc current causes sudden variation of voltage, and rapid variation of arc due to movement of arcing point is called period sudden variation, sharp variation caused by electrode short circuit is called abnormal sudden variation, which will cause serious voltage fluctuations and sudden variation on public buses of the power system. Meanwhile, the caused voltage fluctuations and sudden variation is very fierce. When the two-phase electrodes are shorted out, and one phase is open, the amplitude of variation of the current is the largest, and thus the caused voltage fluctuations and sudden variation is the largest. The arc furnace system is a strongly nonlinear system with a three-phase coupled feature, and its parameters are time-varying, and at the same time, are influenced by random perturbation. It is a world-wide puzzle for control engineers to adjust proper length of the arc and make it stable through an electrode regulation system. As for power saving in smelting steel by arc, power consumption per ton of steel is lowered by 1-2 kwh once the smelting time is shorted by 1 minutes, and it is effective to shorten the smelting period by using computers to control the smelting period of the arc furnace. In the melting period, the power consumption is over 60% of the whole smelting process, the power consumption is directly influenced by the power supply during the melting period, but the condition in the furnace during the melting period is complicated, which is accompanied by firing, penetration, short circuit, arc breaking, splatter, and evaporation, which cause unceasing variation of arc power and operation current. Under manual control, It is hard to achieve the objectives of lowering the temperature of the steel, reducing the waiting time for steel, stabilizing arc current, reducing the times of short circuit and breaking arc, shortening the melting period, lowering power consumption per ton of steel. However, the automatic control of the furnace is mainly control of voltage of the electrodes, and control of the input power, while the electrode controlling system consists of a hydraulic system, due to mechanical inertia, the regulation of the electrodes is slow in speed and weak in sensitivity, and cannot follow up with the sharp variation of the arc, and thus cannot compensate timely, which is the most hardest part. In the process of smelting period, the length of the three-phase electrodes should be changed with respect to the length of the arc, and regulated based on the relative distance between the electrodes and the raw materials, thereby ensuring the length of the arc stable to make best use of the arc to melt the furnace burden. As the controlled objects of the AC arc furnace in smelting has characteristics of highly nonlinear, strong coupling, time-dependent nature and time-lagging nature, in the process of melting, external perturbations are very obvious, and variation of arc length and deviation is large, which requires a electrode controller having a characteristic of relatively higher fast response without overshoot.

Background technology of electric locomotive traction: high-speed railways are system integration of innovative and high technology, and its construction and operation reflect the scientific and technological strength of a country. In May, 1985, the Economic Commission for Europe of the United Nations stipulated that passenger transport line with running speed over 300 km per hour and mixed passenger and freight line with running speed over 250 km per hour are high speed railways. The existing traction transformer mainly use non-excitation regulator, which has small range of voltage regulation. The traction transformer is used for transmitting the power of three-phase power supply system to two single-phase traction lines with loads respectively. The two single-phase traction lines are used for powering the uplink and downlink locomotives. In an ideal case, the two single-phase loads are the same. Thus, the traction transformer is used as a transformer for transforming three phases into two phases. The traction transformer is a power transformer of a special voltage class, should meet the requirement of fierce variation of traction load and frequent external short circuit, and thus is the "heart" of the traction substation. In China, the traction transformer is divided into three types, i.e., a three-phase, a three-phase to two-phase, and a single phase, and thus the traction substation is divided into three types, i.e., a three-phase, a three-phase to two-phase, and a single phase.

Background technology of voltage regulator: a voltage regulator is voltage regulating power source for supplying adjustable voltage to loads; it can convert the distribution voltage of the uncontrollable power grid; it can be used for any load voltage which may be regulated in a stepless manner in a certain range, and is divided into, based on the electromagnetism principle and structure, a contact voltage regulator, a induction regulator, a magnetic voltage regulator, a moving-coil regulator, a purification regulator (stabilizer), a saturated reactor, an auto regulator and the like.

The contact voltage regulator has a capacity of 0.1 to 1000 KVA, a voltage class of 0.5 KV, a range of voltage regulation of 0 to 100%. The induction voltage regulator has a capacity of 6.3 to 4500 KVA, a voltage class of below 10 KV, a range of voltage regulation of 5 to 100%. The magnetic voltage regulator has a capacity of 5 to 1000 KVA, a voltage class of below 0.5 KV, a range of voltage regulation of 15% to 100%. The moving-coil regulator has a capacity of 1000 to 2250 KVA, a voltage class of below 10 KV, a range of voltage regulation of 5 to 100%. The contact auto regulator has a capacity of 20 to 1000 KVA, a voltage class of 0.5 KV, a range of voltage regulation of ±20%. The induction auto regulator has a capacity of 20 to 5600 KVA, a voltage class of below 10 KV, a range of voltage regulation of ±20%. The purification stabilizer has a capacity of 1 to 300 KVA, a voltage class of 0.5 KV, a range of voltage regulation of ±25%. The thyristor voltage regulator has a capacity of below 450 KVA, and a voltage class of below 10 KV.

Background technology of reactive compensation: it is common knowledge of the designers and decision makers all over the world to use the reactive compensation technology to improve the power factor of a system, and the investment of the reactive compensation device has been listed in the integrated planning of electric power investment, which has become an indispensable link. At present, the power factor of the main power network equipment is on the order of 1, the law of Russia provide that the power factor should greater than 0.92, and Japan and other countries have established nationwide reactive power management committee to research technical economic policy about reactive compensation. Practically, almost all the developed countries have higher power factors of power grids. Thus, it is a tendency in power grid to greatly improve the power factors of power grids, lower line loss, save energy, and develop the capacity of power generation assemblies.

TECHNICAL PROBLEM

Technical problem of AC voltage regulator: the voltage generated by the existing AC voltage regulator when regulating voltage is not continuous, and its waveform is discontinuous. There are lots of zero crossing point, the voltage and current is non-continuous, which cause large voltage fluctuation, and non-continuous current causes too many times of arc breaking and arc starting, the power input is non-continuous and the harmonics wave is large. Poor arc stability affects the yield and quality of the product, causes internal overvoltage in the transformer and load, which has adverse effect on isolation of the transformer, switches, motors and other loads, affects their useful life, increases energy consumption, and causes significant problems of unbalanced input power of resistive, inductive, and capacitive loads and related devices. The AC voltage regulator uses a thyristor phase controlling circuitry, and high-voltage and low-current controllable power source may include lots of thyristors connected in series, or may use AC voltage regulation circuitry to adjust the secondary voltage of the transformer, low-voltage and high-current power source may include lots of thyristors connected in parallel. The circuitry topography thereof is complicated, expensive, and tends to produce non-continuous waveforms.

With the rapid economic development, a variety of electrical equipments are developed toward a high-voltage, and large-capacity direction, the development of power electronics technology cannot keep up with the needs of development, and thus it is desirable to obtain a stepless or stepped voltage regulation technology by using a small-capacity, low-voltage, and low-current AC voltage regulator to control a high-current, large-capacity and high-current transformer or other loads.

Technical problems of the existing transformer switches: the transformer switches has slow response, and their service life is short, after 3000 times of usage, the switches are required to change oil and maintain. Also, they have complicated structures, discharge arc at the contact terminals, and pollute transformer oil in the transformer having oil immersed structure. Currently, it is a urgent need to develop a transformer switch capable of eliminating offset voltage and preventing the capacitor discharge in reversing changeover voltage regulating, and having fast response, long life, no arc and easy maintenance in normal use.

Technical problems of the conventional series voltage regulating transformer: conventional series voltage regulating transformers are applied to 10000 KVA or higher furnace transformers, or sometimes, to rectifier transformers, are conventional form of furnace transformers, which are rarely utilized due to higher cost and development of smelting technologies. Currently, as the series voltage regulating transformer adopts AC voltage regulating electronic switches, the usage and functions of the series voltage regulating transformer are largely extended, we must modify and improve the series voltage regulating transformer to meet different needs.

Technical problems of the ultra-high voltage AC power transmission: the main drawbacks exist in ultra-high voltage power transmission is the stability and reliability of the system. From 1965 to 2010, 7 AC large power system collapse accidents happened, wherein 5 accidents happened in US, and 2 accidents happened in Europe. These serious large power system collapse accidents illustrate that the power system which adopts AC interconnection has drawbacks of poor safety and stability, accidents chain reaction, and massive power outage.

As for system stability, short-circuit reactance of a power system is a key factor. One of the main measures to limit capacity of short circuit by the power system is using high impedance transformers. The increasing of reactance of the transformer will improve the stability of the system, and limits on short-circuit current will cause decrease in electromagnetic force of short circuit and heat effect of the current, and meanwhile, it is also possible to decrease the cut-off capacities of line breaker and other electrical equipments, and reduce or even cancel current limiting reactor, but the high impedance transformer will increase the reactive power of the power grid. The reactive power consumed by the transformer is about 10%~15% of its rated capacity, when the supplied voltage is higher than its rated value by 10%, the reactive power will rapidly increase due to saturation of magnetic circuit. According to statistics, when the supplied voltage is 110% of the rated value, the reactive power will typically increase about 35%. When the supplied voltage is lower than the rated value, the reactive power will decrease correspondingly, so that the power factor will be improved. But, the decrease of supplied voltage will affect proper functioning of the electrical equipments. Thus, measures should be taken so that the power supplied voltage of the power system remains stable.

A transformer will play an important role in high voltage, ultra-high voltage and extra-high voltage AC power grids, if it has the following characterizes. That is, the transformer capable of regulating in a high speed, functioning reliably, regulating active power in a high speed, and achieving "current tip" (change of flow direction of power), and in normal condition, has lower impedance to ensure stable output, in accident conditions, can make the system stable in a high speed, and can suppress oscillating damping and synchronous oscillation, has functions of splitting phases voltage regulation, and high-speed voltage stabilization, the transformer has lower impedance in normal condition, and will transform into a high-impedance or even ultra-high impedance transformer instantaneously in sudden short circuit or other emergencies.

Technical problems of the DC power transmission: the DC convertor station has many devices, a complicated structure, high costs, high loss, high operating expense, and lower reliability. The convertor will generate lots of harmonics during operation. And if the harmonics are not processed properly and flowed into the AC system, it will cause a series of problems to normal operation of the AC power grid. Thus, lots of and groups of filters must be provided to eliminate these harmonics. Secondly, conventional power grid commutation direct-current transmission will absorb lots of reactive power while transmitting the same power, which is about 50%-60% of the active power. Thus significant reactive power compensating devices and corresponding control strategy are required. Additionally, there are some technical difficulties in grounding electrodes in DC power transmission and DC circuitry breakers.

Technical problems of the electrochemical electrolytic system: if there is no fine regulation of reactor, currents among various parallel rectifier units and three phases are hard to be equilibrated and the circulating current is extremely large, sometimes, even accidents of burning transformer will happen, due to incapable of fine regulation of various phases and various units. In this case, various parallel rectifier units or single unit are required to have rectifier cabinets with the same commutation reactance, so as to avoid unbalancing of loaded current distribution caused by lack of fine regulation of saturated reactors among units or rectifier cabinets. As for silicon rectifier units provided with saturated reactor and loaded tap switches, instantaneous variation of current may be reflected rapidly. However, the units have large floor space, extremely large noise, large harmonics, high costs, high energy consumption, and significantly lowered power factor, and thus barely utilized currently. Currently, switch stages are increased to maintain constant current in electrolytic industry.

At the present, in the electrochemical electrolytic system, there is an urgent need for a rectifier transformer which is an automatic high-speed current stabilizer, and which enables the electrolytic system utilizing a constant current control scheme and having small harmonics, fast voltage regulation speed, the stabilize is capable of split-phase voltage regulation, responding to current variation in a high speed, and operating in a high speed when three-phase short circuit occurs, and increasing the impedance of the transformer or even increase the system reactance close to 100%.

Technical problems of the AC/DC furnace smelting system: at the present, the arc furnace electrode regulation control system has high costs, frequent maintenance, complicated controlling links, high failure rate, slow response speed, failure to follow up with saltatory variation of the arc and compensate timely, which causes lower degree of automation in furnace smelting industry. Due to current control of the arc furnace, the above electric equipment are often regulated by controlling the lifting device of the electrodes, thereby controlling the input power of the furnace, and the arc voltage drop is about 12V/cm, the longer the arc, the larger the voltage drop. If the electrode voltage regulation function is accomplished by other components, and the length of the arc is controlled in a certain range, lots of electrical power will be decreased. Sudden short-circuit of electrodes often occurs in the above electrical equipment, and arc current has seen a dramatic change significantly. The caused voltage fluctuations and sudden variation are the largest, and thus it is desirable to obtain an electrical equipment capable of rapidly regulating voltage within milliseconds or setting automatic control programs according to characteristics of respective furnace in advance, thereby reducing voltage fluctuations and sudden variation obviously.

Electric furnace smelting system: at present, in the prior art, all the arc furnace and submerged arc furnace systems utilize a conventional smelting process to adjust the input power by controlling lifting of the electrodes in various power regulation solutions. Currently, it is an urgent need for an electric furnace smelting system capable of regulating voltage, stabilizing current, without lifting up/down the electrode. At the same time, the system is capable of responding rapidly, ease to auto control, saving energy and reducing consumption. The system may operate very fast in three-phase short circuit, and make the impedance of the system increase or even close to 100% in high speed. However, in resistance furnaces and related smelting systems requiring temperature regulation, a technology for maintaining continuous voltage and current with continuous waveforms and waveforms even close to sine waves is required, and in electric furnaces requiring stepless voltage regulation, the voltage regulator has lower voltage class, lower capacity, and cannot be produced in large scale.

Technical problems of the electric locomotive traction system: lower power factor, unbalanced loads. In unbalanced loads, split-phase voltage regulation is not possible, the traction transformer cannot suppress short-circuit current and stabilize voltage, the traction transformer cannot adjust voltage and stabilize voltage in a high speed, and adjust capacities for two systems at the same time. Three-phase imbalance in high-voltage side and large harmonics in DC systems make the traction transformer incapable of control the system safely, efficiently, synchronously and intelligently, and make the transformer suffering from high over load or mechanical pressure generated upon short circuit.

Technical problems of the voltage regulator: as can be known from the above, all types of voltage regulator have capacities below several KVA. Voltage classes below 10 KV cannot meet the requirement of various industries, and thus it is desirable to obtain a new voltage regulator having large capacity of voltage regulation, higher voltage class, small harmonics, and range of voltage regulation in 0 to 100%, to meet the market requirement.

Technical problems of reactive compensation: as the development of long-distance Extra High Voltage transmission system, the reactive power consumption in the power grid is also increased. Especially, as the application of power electronic devices increasingly widespread, however, most of the electronic devices have lower power factors, which result in quality decreasing of power supply, as well as bringing additional burden on the power grid. Technical solution of the high voltage parallel reactive compensation device is the simplest and cost-optimal compensation solution. However, it has three drawbacks. Firstly, the reactive compensation of the reactive compensation device is an average compensation in an operation process, may not compensate the voltage drop of the bus bars, and may not reduce the voltage fluctuations of networks caused by fierce variation of loads. Secondly, it cannot improve the active power of electrical equipment loads. Thirdly, the used reactive compensation device has high voltage class, and is expensive.

There are three types of low-voltage reactive compensation device solution. The first one is a compensation solution that the low-voltage devices are directly connected to the reactive compensation device in parallel. This compensation solution has the best effects of saving energy and reducing costs, but has drawbacks of only applicable to electrical equipments with constant secondary voltage. The second one is a compensation solution that a reactive compensation device is connected to the network through a step up transformer (compensation transformer), and this solution has constant loading parameters, and belongs to voltage regulation compensation. It has drawback that as one compensation transformer is added, the primary capitalized cost is too large, and the loop inductive reactance and electrical loss are increased substantially, and the parallel reactive compensation device has higher voltage class. The third one is a compensation solution that the parallel reactive compensation device is connected to the network through low-voltage compensation winding, wherein compensation windings are added at the low-voltage side, and reactive compensation devices are connected thereto in parallel, and the solution has drawback of only applicable to electrical equipments with constant secondary voltage.

TECHNICAL SOLUTION

The theoretical basis for technical solution: a superposition principle of waveform based on conceptions of waveform continuity and flexible voltage regulation is characterized in that, a plurality of pulse bursts formed by a sine wave or a plurality of sine waves with the same frequency, synchronized (the same) initial phase or having a phase difference of $\pi$ (staggered by a half wave), amplitude of which depend on the phase controlling degree or chopping degree of an AC voltage regulator, and a waveform with a part of itself missed or chopped, is/are superposed on circles of a (or a plurality of) constant voltage (or adjustable voltage, referred to as constant voltage, hereinafter the same) sine wave, or the waveform and amplitude are waveform and amplitude output by conventional voltage regulator regulating sine wave voltage respectively, the combined voltage waveform is determined by two superposed waveforms, thus the problems of interrupted voltage waveform, voltage regulating and oversize harmonics are resolved by superposition of two waveforms. That is, a technology of synthesizing voltage by superposing a voltage, the amplitude of which can be continuously regulated in a stepped or stepless manner, and which can be positive or negative polarity, on a sine wave constant voltage, is a technology of forming continuous waveform and removing harmonics contents. The formula of combined voltage is presented as $U=U_1 \pm U_2$ (wherein, U represents for the combined voltage, $U_1$ represents for the constant voltage, $U_2$ represents for the superposed and adjustable voltage).

Conventional voltage regulators comprise a contact voltage regulator, an induction regulator, a magnetic regulator, shifting coil voltage regulator, a purification voltage regulator, a saturation reactor, an automatic voltage regulator, thyristor voltage regulator and the like.

A superposition principle of waveform based on conceptions of waveform continuity and flexible voltage regulation from the viewpoint of power electronics technology is characterized in that, a plurality of pulse bursts or sine waves formed by a sine wave with the same frequency, the same initial phase or having a phase difference of $\pi$ (staggered by a half wave), amplitude of which depended on the phase controlling degree of an AC voltage regulator or chopping degree of the AC transformer, and a part of the waveform part of which is missed or chopped, is superposed on circles of a constant voltage sine wave, and the combined voltage waveform is determined by two superposed waveforms.

Even semiconductor devices are not linear units, but they regulate the voltages of the primary windings of the transformer used by voltage regulation power source (as described below). However, the superposed waveforms according to the superposition principle of waveform of the present invention are waveform of a sine wave or approximate sine wave superposed and obtained by voltage waveforms output by the secondary side of the transformer used by the voltage regulation power source and voltage waveforms output by another sine wave power source (or power grid or secondary winding of the transformer, they output sine waves). The superposition principle of waveform used by the present invention is based on voltage waveform continuity and flexible voltage regulation, and in a series voltage regulation circuitry of the secondary voltage (obtained and synthesized by secondary voltage of the transformer used by the voltage regulation power source and the secondary voltage of the power source or other transformer) synthesized by two power sources, the used transformer operates in the unsaturated region, and the series voltage regulation circuitry of the secondary voltage may be considered as a linear circuitry at any moment at any steady state. The circuitry is divided in two situations. In one aspect, when the AC voltage regulator is used as a switching element, its output waveform is a sine wave, and there is no problem to apply superposition principle of waveform. In another aspect, the secondary winding of the AC voltage regulator is connected to a sine wave power source with the same frequency in series in a phase controlled process, the two voltage source may be replaced by a voltage regulation power source, which act on a linear circuitry together (in accord with replacement theorem), and thus the two power source waveforms may be superposed. At this time, the output voltage of the voltage regulation power source is defined, and in this process, the secondary series voltage regulation circuitry may be considered as a liner circuitry, and it may be referred to as a instantaneous linear circuitry which is a secondary circuitry consisting myriad instantaneous linear circuitries, and to which the superposition principle of waveform may be applied, and thus the method for superposing waveforms based on the superposition principle of waveform according to the present invention is possible. The flexible voltage regulation technology combined with superposition principle of waveform enables the application of AC voltage regulators and semiconductor elements to break through the limit of voltage class and capacity, which is very important to the development of power electronics technology.

The superposition principle of waveform based on conceptions of waveform continuity and flexible voltage regulation is the theoretical basis of flexible AC transformation technology, flexible power transmission and transformation technology, a flexible voltage regulation technology and a transient impedance technology, and the combination of high-speed stepless voltage regulation technology and high-speed stepped voltage regulation technology enables the stepless voltage regulation outputting waveform to be infinitely close to a sine wave in principle, and it is very important to the development of stepless voltage regulation technology.

The flexible AC transformation technology according to the present invention, characterized in that, by combining the power electronics technology with AC conversion technology, the capacity, voltage, reactance and other technical indexes of the power transformation devices are controlled in a high speed by using the function of high-speed control of an AC power control circuitry.

The flexible power transmission and transformation technology according to the present invention, characterized in that, by combining the power electronics technology with AC conversion technology and AC/DC transmission technology, the high voltage or ultra-high voltage AC/DC power transmission power grid is safely, efficiently and synchronously controlled by using power electronics technology to regulate power transformation devices in a high speed.

The flexible voltage regulation technology according to the present invention, characterized in that, formed by combining power electronics technology and AC conversion technology, by using the high-speed control capability of the power electronic components on phase control and on-off of the waveform of the sine waves, and the performs high-speed stepless voltage regulation, or high-speed stepped voltage regulation or both of stepless voltage regulation and the stepped voltage regulation as well as arbitrary switching between the stepless voltage regulation and the stepped voltage regulation in a high speed based on superposition principle of waveform, so as to output a voltage waveform close to sine wave while using stepless voltage regulation, and intelligently regulate secondary output voltage of the transformers in a high speed while using stepped voltage regulation. The flexible voltage regulation technology can be classified into flexible stepped voltage regulation technology and flexible stepless voltage regulation technology.

The flexible AC transformation technology and flexible voltage regulation technology may be applied to large capacity and high voltage class. It is required to regulate the voltage continuously by step regulation, and also to regulate the voltage smooth by stepless regulation, especially, in a resistance, resistance-inductance or resistance-capacitance AC load system requiring continuous voltage waveform without discontinuation region.

Technical solution of the AC voltage regulator: the principle features of the new AC voltage regulator of the present invention are that the regulator to which the AC voltage regulator and the superposition principle of waveform are applied is referred to as the new AC voltage regulator. The voltage regulation principle is that an AC power source (voltage regulation power source) controlled by an AC voltage regulator is connected to an AC power source with constant voltage (or adjustable voltage, but the voltage is determined when the AC voltage regulator is in a phase control state) sine waves in series, the two power sources outputs periodic waves with continuous voltage waveforms and the same frequency, the generated capacity of harmonics is changed from the harmonics generated by whole capacity regulation in the prior AC power control circuit to harmonics generated by a part of capacity of the regulated range of voltage (capacity of the voltage regulation power source), and thus the harmonic content is largely reduced.

The structural features of the new AC voltage regulator is that, a sine periodic wave is further superposed on the periodic wave having non-continuous waveform output by the AC voltage regulator based on the superposition principle of waveform, so as to resolve the problem of non-continuous voltage waveforms. In brief, the primary voltage of a transformer is regulated by the AC voltage regulator, so that the induced secondary voltage is connected in series to the voltage output by a sine wave power source (power grid or the secondary winding of another transformer) to output voltages together, as the voltages at a and x terminals in FIG. 1. The AC voltage regulator to which this kind of voltage regulation solution is applied is the said new AC voltage regulator.

When the two AC switches connected to the voltage regulation power source at two sides thereof in parallel are combined into a positive/negative regulating switch, and then connected to a constant voltage power source in series, the formula for combined voltage is expressed as $U=U_1 \pm U_2$ (wherein, U represents for output voltage, $U_1$ represents for voltage of constant voltage power source, $U_2$ represents for the output voltage of the voltage regulating power source).

The structural features of the voltage regulating power source are that the voltage regulating power source is an electromagnetic induction device controlled by an AC voltage regulator, which is typically formed by a two-winding transformer (or other form of transformer), the AC voltage regulator control the primary side winding voltage to regulate the secondary winding voltage, and the output voltage and voltage waveform of the secondary winding are the output voltage and voltage waveform of the voltage regulating power source, as the voltages at a and x4 terminals in FIG. 1. Properly speaking, the principle of the new AC voltage regulator is that the primary winding of a transformer is phase controlled by an AC voltage regulator, and then the secondary side winding of the transformer is connected to anther constant voltage power source in series.

Technical solution of the transformer switch: the existing transformer switch is replaced by an AC voltage regulating electronic switch. The principle, objectives and characteristics of the AC voltage regulating electronic switch are that: the principle of voltage regulator of the AC voltage regulating electronic switch is based on that the new AC voltage regulator regulates the voltage of a tertiary side voltage regulation winding of a series voltage regulating transformer (as described below) by utilizing the characteristics of basic voltage regulator circuitry of the transformer. The method for voltage regulation is that the linear voltage regulation portion employs the technology of high-speed sequential step latching stage turns by using an AC voltage regulator, that is, sequentially cut or add the stage turns (stepped voltage regulation) in the voltage regulation circuit, or adjust the turns of the tertiary side winding (i.e., voltage regulation) by using the method of high-speed sequential step phase controlled level voltage (stepless voltage regulation). Reversing change-over switch is used for reversing change-over voltage regulating to control the polarity of the tertiary side winding in a high speed, and coarse-fine regulation is formed by connecting two portions of linear regulation in series (two portions of linear regulator are connected in series after regulating voltage), so as to control the voltage and polarity of the primary winding of the series transformer, thereby achieving the aim of regulating the voltage and polarity of the secondary winding of series transformer, and the electronic switch has voltage regulation range of 0 to 100%.

One of the characteristics of the AC voltage regulating electronic switch according to the present invention is that: it is a series voltage regulation circuitry formed by a constant voltage power source (basic windings), a voltage regulating power source (stage voltage in the regulating windings, also referred to as stage turns, all the voltage regulation power source are regulating windings), an AC voltage regulator (or AC switches), and a measuring and control device based on the superposition principle of waveform, which includes the following three basic voltage regulation principles.

The first is the linear regulation principle (FIG. 2). That is, in the series voltage regulation circuitry, the voltage of the entire constant voltage power source (basic windings) is set to the lower limit of the range of voltage regulation (i.e., the upper limit of the required voltage is subtracted from the lower limit of the required voltage). As long as the output maximal voltage of the voltage regulating power source (all the voltage regulation power source are regulating windings, and each voltage regulation power source is the stage tunes of the regulating windings) is equal to the range of voltage regulation. When regulating voltage, the AC voltage regulator is used to lock the voltage regulating power sources one by one, that is, by using a method of removing (or adding) the voltage regulating power sources from (or into) the series voltage regulation circuitry one by one.

The second is the reversing change-over voltage regulating principle (FIG. 3). That is, in a series circuitry of linear voltage regulation, the voltage of the constant voltage power source is determined by adding the lower limit of the range of voltage regulation and a half of the range of voltage regulation, the maximal voltage output by the voltage regulating power source is a half of the range of voltage regulation, reversing change-over switches are mounted at two ends of the voltage regulating power source or the constant voltage power source. By regulating the polarity of the constant voltage power source and the voltage regulating power source and addition or subtraction of the voltage of the two power sources, the combined voltage finally output will meet the requirement of the range of voltage regulation.

The third is the coarse-fine regulating principle (FIG. 4). That is, in a series circuit, a constant voltage power source is connected to several voltage regulating power sources for coarse regulation in series, and then connected to several voltage regulating power sources for fine regulation in series. The voltage of all of the voltage regulating power sources for fine regulation can be equal to the voltage of a voltage regulating power sources for coarse regulation. The voltage of the constant voltage power source is set to be the lower limit of the range of voltage regulation, and the voltages of several the voltage regulating power sources for coarse regulation plus the voltages of several the voltage regulating power sources for fine regulation is equal to the range of voltage regulation. When outputting the minimal voltage, it is only need to remove all of the power sources for coarse regulation and fine regulation. When outputting the maximal voltage, it is only need to add all of the power sources together in series. When outputting intermediate voltage, the series voltage regulation circuitry can be formed by the constant voltage power source connecting, in series, the circuitry which can remove the voltage regulating power sources for coarse regulation step by step in a high speed, and then connecting, in series, the circuitry which can remove or add the voltage regulating power sources for fine regulation step by step in a high speed.

These are three most common basic voltage regulation circuitries, from which various voltage regulation circuitries can be derived. Such as, a coarse-fine regulating circuit, the voltage regulating power sources for coarse regulation of which having reversing change-over function, can be obtained by mounting a reversing change-over switch at the voltage regulating power sources for coarse regulation in the coarse-fine regulating circuitry. A coarse-fine regulating circuit, the voltage regulating power sources for fine regulation of which having reversing change-over function, can be obtained by mounting a reversing change-over switch at the voltage regulating power sources for fine regulation in the coarse-fine regulating circuitry. And there are many ways of derivation, which are not specifically described herein. The above only describes situations of single phase, and only one of three methods for combining the voltage regulation method with the AC voltage regulators is described. In practice, there may be more than one constant voltage power source, and there may be more than one voltage regulating power source. The voltage regulating power sources for coarse regulation can have one or more stages, and the voltage regulating power sources for fine regulation can have two or more stages. All the voltage regulating power sources for fine regulation is not necessary to be equal to a voltage regulating power sources for coarse regulation. There are many options for positions of voltage regulation, such as, intermediate voltage regulation (FIGS. 5 and 6), end portion voltage regulation (FIG. 7), and neutral point voltage regulation (FIG. 8) and so on, and even an auto transformer can be formed by tapping on the constant voltage power source or the voltage regulating power source which are connected in series. There are various combinations for voltage regulation methods and voltage regulation positions and extracting positions for each tap terminals of the winding, and various combinations thereof. And furthermore, the AC voltage regulators are regulated based on the voltage regulation properties, the AC voltage regulators remove the voltage regulating power source step by step, anyway, as long as the voltage regulation principles of the combinations are the same to the principle of the AC voltage regulating electronic switch, similar in usage, and the principle for combining phases is the same to the principle for combining loaded switches of the transformer, the combinations fall into the scope of the AC voltage regulating electronic switch of the present invention.

The formula for combined voltage of the AC voltage regulating electronic switch based on the linear regulation principle is recited as $U=U_1+U_2$ or $U=U_1-U_2$ (wherein, U represents for output voltage, $U_1$ represents for voltage of constant voltage power source, $U_2$ represents for the output voltage of the voltage regulating power source).

The formula for combined voltage of the AC voltage regulating electronic switch based on the principle of reversing change-over voltage regulating is recited as $U=U_1 \pm U_2$ (wherein, U represents for output voltage, $U_1$ represents for voltage of constant voltage power source, $U_2$ represents for the output voltage of the voltage regulating power source).

The feature (2) of the AC voltage regulating electronic switch is that: by applying the AC voltage regulating electronic switch to the transformer according to the superposition principle of waveform as described by the present patent, using the constant voltage power source as a basic coil, using all the voltage regulating power sources as voltage regulation coils, using each of the voltage regulating power sources as stage voltage (stage turn), the switch, which has a high-speed stepped voltage regulation function or a high-speed stepless voltage regulation function and transient impedance regulation technology to cope with short-circuit and other emergencies, is the AC voltage regulating electronic switch for transformer as defined by the present patent, which is also referred to as the AC voltage regulating electronic switch.

The AC voltage regulating electronic switch can be used for stepless voltage regulation (when the AC voltage regulator is used for phase controlling, preferably, each of the AC voltage regulators only phase control a stage of voltage to ensure minimal harmonics) and stepped voltage regulation (when the AC voltage regulator is on or off). The design of applying conventional voltage regulator and other stepless voltage regulation devices to the tertiary side winding of the series voltage regulating transformer, or combining the AC voltage regulating electronic switch with conventional transformer switches, falls into the scope of the AC voltage regulating electronic switch.

The formula for combined voltage of the AC voltage regulating electronic switch based on the principle of reversing change-over voltage regulating is recited as $U=U_1 \pm U_2$ (wherein, U represents for output voltage, $U_1$ represents for voltage of constant voltage power source, $U_2$ represents for the output voltage of the voltage regulating power source), the formula for combined voltage of the AC voltage regulating electronic switch based on the linear regulation principle is recited as $U=U_1+U_2$ or $U=U_1-U_2$ (wherein, U represents for output voltage, $U_1$ represents for voltage of constant voltage power source, $U_2$ represents for the output voltage of the voltage regulating power source).

The feature (3) of the AC voltage regulating electronic switch is that: the technology of locking stage turns by the AC voltage regulator of the AC voltage regulating electronic switch is using an AC voltage regulator to remove undesirable stage turns from the voltage regulation winding circuitry in a high speed or add the removed stage turns into the voltage regulation winding circuitry step by step. There are many such kind of methods, a simple one of which is described herein. That is, by leading out all the stage turns of the voltage regulation coil, except for the head end A, connecting each of the leading-out terminals (including the tail end) to an AC voltage regulator, and then shorting out the other terminals of all the AC voltage regulator as X. When a stage of voltage is required, it is only required to turn on the AC voltage regulator to which the stage of voltage belongs, and turn off all other AC voltage regulators. If it is required, the terminal A may also be connected to the AC voltage regulator, and the other terminal of the AC voltage regulator is shorted out. There are many removing methods, which are not described completely. But any methods using an AC voltage regulator for removing, in high-speed, undesirable stage turns for the voltage regulation winding from the voltage regulation winding circuitry step by step or adding the removed stage turns into the voltage regulation winding circuitries through any series parallel methods, belong to the technology of locking stage turns by the AC voltage regulator of the AC voltage regulating electronic switch as defined by the present patent.

The feature (4) of the AC voltage regulating electronic switch is that: there are many methods for regulating the polarity of the windings by the reversing change-over switch through series or parallel AC voltage regulators. A simple one of which is described below. That is, each of the both ends of the voltage regulation winding is connected to an AC voltage regulator, and the other ends of the two AC voltage regulators are shorted out to a K terminal, which is connected to the head end or tail end of another coil. One AC voltage regulator is turned on and the other is turned off when performing forward voltage regulation, and the latter is on and the former is off when performing backward voltage regulation. The reversing change-over switches, which switch the polarity of the voltage regulation winding (or tertiary winding supplying power thereto) by using any series parallel methods, are the reversing change-over switch as defined by the present patent.

The feature (5) of the AC voltage regulating electronic switch is that: the AC voltage regulating electronic switch is formed by connecting a group of semiconductor device in series or in parallel (in principle, there are various series parallel methods). No matter which method, as long as the switch is formed by semiconductor devices and is conform to the principle of voltage regulation of the AC voltage regulating electronic switch, and is in conformity with the superposition principle of waveform as defined by the present patent, and is connected to the tertiary winding of the series voltage regulating transformer as defined in claim 2 in series or in parallel, and can regulate voltage in high speed, the switch is the AC voltage regulating electronic switch as defined by the present patent.

The feature (6) of the AC voltage regulating electronic switch is that: the AC voltage regulating electronic switch is formed by connecting a group of semiconductor device in series or in parallel (in principle, there are various series parallel methods). No matter which method, as long as the switch is formed by semiconductor devices and is conform to the principle of voltage regulation of the AC voltage regulating electronic switch, is applied to the primary or secondary side winding of any one of the high voltage transformer, it is the AC voltage regulating electronic switch as defined in the present patent. But it has large harmonic waves, and is easy to have accidents when applied to high-voltage and middle/high capacity devices, has lower voltage class under the same number of AC voltage regulators, lower capacity, which is not applied in general case.

The feature (7) of the AC voltage regulating electronic switch is that: the AC voltage regulating electronic switch (or the new AC voltage regulator) when applied to reactor is referred to as an AC voltage regulator reactor electronic switch, which is called the AC voltage regulating electronic switch for short. Of course, it can be applied to other circuitries requiring for voltage regulation, or the switch, belonging to an AC circuitry in which a component or device is required to be replaced (i.e., to be removed or added), is referred to as the AC voltage regulating electronic switch.

The feature (8) of the AC voltage regulating electronic switch is that: the semiconductor components in the AC voltage regulating electronic switch can be replaced by other switching elements, such as, contactors, breakers and other switching elements, and is in conformity with the superposition principle of waveform and AC voltage regulating electronic switch principle or applied transient impedance technology, which belongs to the AC voltage regulating electronic switch as defined in the present patent.

Any electronic switches, which are conform to the 8 features of the new AC voltage regulator and the AC voltage regulating electronic switch and conform to any conditions as recited by the AC voltage regulating electronic switch in claim 1, is the AC voltage regulating electronic switch.

Briefly, the AC voltage regulating electronic switch is formed by connecting semiconductor device in series or in parallel. In principle, there are various series parallel methods. No matter which method, as long as the switch is formed by semiconductor devices, based on superposition principle of waveform, and connected to the tertiary winding of the series voltage regulating transformer as defined in claim 2 (or primary winding of the series transformer) in series or in parallel, or applied to the primary or secondary windings of any kind of the transformers, and has functions of voltage regulation, or AC switch, the transformer resolve problems of non-continuous voltage waveform, voltage regulation, large harmonics, high-speed regulation of reactance of the transformer, replacement of devices or components in circuitries (which means removing or adding), which is the AC voltage regulating electronic switch.

The above switch is combined with the measuring and control device. The measuring and control device consists of an input signal, a measurement portion, a logic portion, a execution portion, an output signal, a tuning value portion and other portions, detects the current, voltage, impedance and other various indicators of the system, the AC voltage regulating electronic switch is controlled in accordance with a compiled program so as to automatically control the transient impedance transformer, and the load may be regulated. The measuring and control device may not be provided, and the measurement is finished by manual operation. FIG. 9 is a schematic diagram showing the principle of a measuring and control device.

The solution of series voltage regulating transformer: the series voltage regulating transformer as defined in the present patent is characterized in that it generically consists of two types of transformers. One is a main transformer (referred as main transformer for short, the transformers with split windings or series transformer, and it can include a plurality of main transformers), the other is a series type of transformer (called the series transformer for short, the trans former with split windings or series transformer, and it can include a plurality of series transformers).

Regardless of whether the voltage regulation winding arranged on the main transformer is required or not by the two transformers to supply power to the primary side of the series transformer, the transformer is referred to as the extended series voltage regulating transformer, and generally called the series voltage regulating transformers, as long as the same secondary windings are connected in series, the voltage of the secondary winding of the main transformer is constant (or adjustable), the voltage of the secondary winding of the series transformer is adjustable so that the voltage of the two secondary winding, which are connected in series, is changed, so as to change the combined voltage of the secondary winding of the main and series transformers, thereby regulating voltage together with loads. The range of application thereof is extended to all the field of transformers, and wherein the structure of the secondary winding can employ any structures of transformer windings.

When the secondary winding of the main transformer of the series voltage regulating transformer is cancelled, the transformer in which one end of the secondary winding thereof directly connected to the power grid (or power source), and the other end is connected to another power grid (or load or power source) is referred to as the series transformer voltage regulation auto transformer, in which the power grid (or power source) serves as a secondary winding of the main transformer, and generally referred to as the series voltage regulating transformer.

When the primary and secondary windings of the main transformer of the series voltage regulating transformer are cancelled, the primary winding of the series transformer is powered by the control power source of the AC voltage regulator, one end of the secondary winding of the series transformer is connected to the other power grid, and the other end is connected to another loaded series voltage regulating transformer, which is a series voltage regulating transformer using the power source as the main transformer.

Two same secondary windings of the series voltage regulating transformer are connected in series to form a single phase second winding of the series voltage regulating transformer (two in-phase secondary windings can employ a splayed coil structure (the structure is showed in FIG. 10), and the two windings can also employ any structures for the transformer coils, and then can be connected end to end, which is called the secondary winding or secondary side of the series voltage regulating transformer). When three phases are required, the secondary winding of the series voltage regulating transformer can be designed as any connecting combinations (comprising an extended triangle).

The primary winding and secondary winding of the series transformer employing an auto transformer type is referred to as an auto series transformer series voltage regulating transformer, and also referred to as the series voltage regulating transformer herein. The primary winding and secondary winding of the main transformer employing an auto transformer type is referred to as an auto main transformer series voltage regulation transformer, and also referred to as the series voltage regulating transformer herein. The main transformer supplying power to the series transformer in a way of auto transformer (or voltage regulating transformer) is referred to as a power supplying series voltage regulating auto transformer, but is referred to as the series voltage regulating transformer, which can be used mixedly.

A transformer belongs to transformers with split windings regardless of the number of split windings and the number of transformers of main transformer or series transformer, and a transformer belongs to series transformer regardless of the number of the windings of transformers connected in series and the split transformer, or the series transformer and split transformer can be used mixedly.

Any transformer in which the secondary side of the transformer is connected in a way of the voltage regulation principle of the series voltage regulating transformer or a voltage is synthesized by two or more variable or constant or adjustable voltage, and regardless how many transformer connected to the secondary side in series (including connection to power grid and power source), is the series voltage regulating transformer type as defined by the present patent.

Any transformer employing transient impedance regulation technology to suppress short circuit or other emergencies or any conventional series voltage regulating transformer employing high-speed voltage regulation function is also the series voltage regulating transformer as defined by the present patent.

The series voltage regulating transformer (the structure is showed in FIG. 11) generally consists of a primary winding, a secondary winding, and a tertiary side winding or referred as a voltage regulation winding, and can consist of a primary winding, a tertiary side winding or referred as voltage regulation winding. The series transformer consists of a primary winding (sometimes may be referred as the tertiary side winding), a secondary winding, or various windings are split or the transformers are split, as long as the winding supplies power to the primary winding of the series transformer, regardless whether it is arranged on the main transformer or on one or more transformer, the winding can be referred to as the tertiary side winding.

The formula for the combined voltage of the secondary voltage of the series voltage regulating transformer is recited as $U=U_1 \pm U_2$ (wherein, U represents for output voltage, $U_1$ represents for the secondary voltage of the main transformer, and $U_2$ represents for the secondary voltage of the series transformer), the range of voltage regulation is 0-100%.

The AC voltage regulating electronic switch has either a high-speed stepless voltage regulation function or a high-speed stepped voltage regulation function, and the series voltage regulating transformer when applied to the stepless voltage regulation system is referred to as a voltage regulator.

The two in-phase secondary windings of the series voltage regulating transformer are connected in series to form a single phase. When three phases are required, the secondary winding of the series voltage regulating transformer can be designed as any connecting combinations comprising an extended triangle, and an extended triangle connection group structure, which has significant effects when the above technology is applied to the prior transformer remolded according to the present technology.

The feature of the series voltage regulating transformer can be other transformer type, such as, two or three or four limbs voltage regulating transformer with by-pass limb, front regulating transformer and other transformers can have the same function.

Currently, as the series voltage regulating transformer are applied to AC voltage regulating electronic switches, the usage and functions of the series voltage regulating transformer are largely extended, in view of this circumstance, the present patent proposes a new form of transformer, referred to as a extended series voltage regulating transformer, (also called series voltage regulating transformer for short), which is a supplement and perfection to conventional series voltage regulating transformers in order to meet different requirements.

Safe solution for suppressing sudden short circuit and maintaining system stability: the transient impedance technology of the present invention is characterized in that (that is, the transient impedance regulation technology, visually, is referred to as a transformer secondary voltage high-speed regulating technology): the transient impedance technology is the transient impedance regulation technology, and a technology of using the high-speed regulator function of the AC voltage regulating electronic switch, when short circuit or other extreme cases occur at the secondary side, the AC voltage regulating electronic switch regulates the secondary voltage of the transformer in a high speed to regulate the reactance voltage drop of the transformer upward or downward so as to maintain the secondary system stable under any emergencies. The transient impedance technology of the present invention mainly employs the AC voltage regulating electronic switch to control the secondary voltage of the series voltage regulating transformer to increase or decrease in a high speed, even makes the polarities of the two in-phase secondary windings opposite so as to form the inductance coils connected in series with opposite polarities, and makes the secondary winding of the transformer immediately become a reactance coil. By regulating the voltage of the secondary winding of the series transformer, the reactance voltage drop of the transient impedance transformer is regulated to a predetermined level in a high speed, in principle. The reactance voltage drop of the transformer can be lowered to almost 100% in theory, and the reactance voltage of the control transformer make the system possible to become a predetermined level in case of emergency, or make the voltage become close to 0, but not equal to 0 (when regulating the voltage to a level next higher than 0 by stepped regulation, stepless voltage regulation can be used for making the secondary voltage close to 0, but not equal to 0), make the short-circuit current under control, but not interrupting the current, thereby maintaining the secondary system stable under any emergencies, and make common transformer or even low-impedance transformer become a reactance-adjustable reactor instantaneously, which is very important for protecting many power equipments, such as, a high voltage power grid and electric furnace smelting.

The time standard for high-speed regulation: the shortest time within which the transformer or other power equipments and all the system consisting of them with such voltage class and capacities shall be capable to withstand under sudden short circuit and other emergencies as specified by international standards.

Technical solution of the transient impedance transformer: the transient impedance transformer is characterized in that: the transient impedance transformer generally consists of an AC voltage regulating electronic switch, a series voltage regulating transformer (it can include a transformer switch as well). In the application of high voltage or ultra-high voltage power grid or low-voltage and high-current system or other resistive, resistive-inductive, and resistive-capacitive load systems requiring step up the reactance instantaneously or stabilizing voltage in a high speed, the reactance voltage drop of the transformer may be regulated to a predetermined or reasonable level in a high speed by using the transient impedance technology of the present invention. The transformer may become a high-impedance transformer in a high speed, that is, under a normal condition, and the transformer is a common transformer, or even a low-impedance transformer in aspects of impedance, loss and the like. When a sudden short circuit or other extreme cases occur, the common transformer becomes a high-impedance transformer or ultra-high impedance transformer instantaneously, thereby ensuring the short-circuit current of the system under the rated current or any level, and when the emergencies are eliminated, the transformer may be restored to a common transformer instantaneously. This kind of transformer is referred to as the transient impedance transformer. the transformer can be classified into a transient impedance power transformer, a transient impedance special transformer, a transient impedance voltage regulator, a transient impedance power transformer and the like based on the technical field of application, and the transformer may be applicable to safety protection of various systems.

Technical solution of the high voltage circuitry breaker: the technical advantages of the transient impedance transformer tertiary side disconnection technology is that the low-voltage tertiary side disconnection portion is used for replacing primary side disconnection, thereby achieving partial replacement of the high voltage circuitry breaker by a cheap and long-life low-voltage circuitry breaker. The principle is that another basic winding is added to the main transformer, and is connected to the regulating windings, a load circuitry breaker is provided between the basic winding and the primary winding of the series transformer, and a short circuit switch is provided at the secondary side, when someone wants to cut off the loading current, the tertiary side circuitry breaker is disconnected, at the same time, the secondary side short circuit switch is closed, as the secondary side is shorted out, the low voltage of the main transformer is wholly applied to the low-voltage windings of the series transformer, and as the high voltage windings of the series transformer are open, the series transformer is under a condition of idle running with the low-voltage windings supplying power thereto. Only no-load current flows through the low-voltage winding. Obviously, the main transformer is under on-load condition, and at this time, the secondary load is under a no electric current, voltage state. The wiring scheme is showed in FIG. 12.

Technical solutions of the transient impedance power transformer: the transient impedance power transformer is characterized in that: the transformer consists of an AC voltage regulating electronic switch, and a series voltage regulating transformer, and the AC voltage regulating electronic switch is connected to the tertiary side of the series voltage regulating transformer, the primary winding of the main transformer of the series voltage regulating transformer is connected to the first power grid, the secondary windings of the main transformer and series transformer of the series voltage regulating transformer are connected to the second power grid or other power loads, and a transient impedance power transformer with split windings, a transient impedance step up power auto transformer, a transient impedance step up power auto transformer with split windings, a high-speed voltage regulation step down power auto transformer, a high-speed voltage regulation step down power auto transformer with split windings, and the like are derived from the transient impedance power transformer.

The transient impedance power transformer is mainly applied to high voltage or ultra-high voltage power grid for power transmission and power grid reactive power control as well as high-speed voltage regulation, safety protection, and reactive compensation of secondary side, and may control the system with intelligent control by the transformer, achieve voltage stability control, control the imbalance of each phase load in a high speed, exempt the transformer from maintenance, adjust the capacity of the transformer.

The transient impedance power transformer with split windings is characterized in that: the transformer consists of an AC voltage regulating electronic switch, and a series voltage regulating transformer. In the first transient impedance power transformer with split windings, the secondary winding of the main series transformer of the series voltage regulating transformer is split into two secondary windings, and in the second transient impedance power transformer, the series transformer is divided into two transformers, which are referred to as a secondary winding (1), and a secondary winding (2), when the first power grid, the second power grid (electric power load) and the third power grid (electric power load) are required to be connected, the primary winding of the main transformer of the series voltage regulating transformer is connected to the first power grid, the secondary winding (1) is connected to the second power grid (electric power load), the second winding (2) is connected to the third power grid (electric power load). If the second power grid (electric power load) and the third power grid (electric power load) need voltage regulation respectively, the second split solution may be used, i.e., the series transformer is divided into two transformers, and then the voltage regulation winding is split into two windings, at this time, two AC voltage regulating electronic switches are required to be connected to the two voltage regulation windings of the series voltage regulating transformer, the primary windings of the two series transformer are powered by the two voltage regulation windings of the main transformer. By regulating different switches, the voltages of the second power grid (electric power load) and the third power grid (electric power load) are regulated respectively. Here, the transient impedance transformer is referred to as the transient impedance power transformer with split windings. As the secondary winding of the series transformer of the series voltage regulating transformer is divided into two secondary windings, when the series transformer is divided into two transformers, as the transient impedance technology can be applied to the two secondary windings respectively, a power grid (an electric power load) will be less influenced if the other power (the other electric power) fails.

The transient impedance step up power auto transformer is characterized in that: the transformer consists of an AC voltage regulating electronic switch, and a series voltage regulating transformer.

The secondary winding of the main transformer is cancelled, and the AC voltage regulating electronic switch is connected at the tertiary side of the series voltage regulating transformer. When the first power grid (at lower voltage) and the second power grid are required to be connected to boost the voltage, the primary winding of the main transformer of the series voltage regulating transformer is connected to the first power grid, and the secondary winding of the series voltage regulating transformer is connected between the first power grid and the second power grid, to regulate the voltage of the second power grid.

The transient impedance step up power auto transformer with split windings is characterized in that: the transformer consists of an AC voltage regulating electronic switch, and a series voltage regulating transformer. The secondary winding of the main transformer is cancelled, the secondary winding of the series transformer is split into two secondary windings, or the series transformer is divided into two transformers. Here, the secondary windings of the series transformer are referred to as a secondary winding (1), and a secondary winding (2). When the first power grid (lower voltage), the second power grid and the third power grid are required to be connected, the primary winding of the main transformer of the series voltage regulating transformer is connected to the first power grid, the secondary winding (1) is connected between the first power grid and the second power grid, the second winding (2) is connected between the first power grid and the third power grid. If the second power grid and the third power grid need voltage regulation respectively, the second split solution may be used, i.e., the series transformer is divided into two transformers, and then the voltage regulation winding is split into two windings. At this time, two AC voltage regulating electronic switches are required to be connected to the two voltage regulation windings of the series voltage regulating transformer. The primary windings of the two series transformer are powered by the two voltage regulation windings of the main transformer. By regulating different switches, the voltages of the second power grid and the third power grid are regulated respectively. Here, the transient impedance transformer is referred to as the transient impedance step up power auto transformer with split windings. As the secondary winding of the series transformer of the series voltage regulating transformer is divided into two secondary windings, when the series transformer is divided into two transformers, as the transient impedance technology can be applied to the two secondary windings respectively, a power grid will be less influenced if the other power fails. In this solution, the power grid with lower voltage is used as the secondary winding of the main transformer.

The high-speed voltage regulation step down power auto transformer is characterized in that: the transformer consists of an AC voltage regulating electronic switch, and a series voltage regulating transformer, the secondary winding of the main transformer is cancelled, the AC voltage regulating electronic switch is connected at the tertiary side of the series voltage regulating transformer. When the first power grid (at higher voltage) and the second power grid (electric power load) are required to be connected to step down voltage, the primary winding of the main transformer of the series voltage regulating transformer is connected to the first power grid, the first power grid and the second power grid (electric power load) are connected by the secondary winding of the series transformer, and the first power grid is used as the secondary winding of the main transformer of the series voltage regulating transformer, to regulate the voltage of the second power grid (electric power load).

The high-speed voltage regulation step down power auto transformer with split windings is characterized in that: the transformer consists of an AC voltage regulating electronic switch, and a series voltage regulating transformer. The secondary winding of the main transformer is cancelled, and the secondary winding of the series transformer of the series voltage regulating transformer is split into two secondary windings, or the series transformer is divided into two transformers, which are referred to as a secondary winding (1), and a secondary winding (2). When the first power grid (higher voltage), the second power grid (electric power load) and the third power grid (electric power load) are required to be connected, the primary winding of the main transformer of the series voltage regulating transformer is connected to the first power grid, the secondary winding (1) is connected between the second power grid (electric power load) and the first power grid, the second winding (2) is connected between the third power grid (electric power load) and the first power grid. If the second power grid (electric power load) and the third power grid (electric power load) need voltage regulation respectively, the series transformer may be divided into two transformers, and then the voltage regulation winding is split into two windings. At this time, two AC voltage regulating electronic switches are required to be connected to the two voltage regulation windings of the series voltage regulating transformer. The primary windings of the two series transformer are powered by the two voltage regulation windings of the main transformer, respectively. By regulating different switches, the voltages of the second power grid (electric power load) and the third power grid (electric power load) are regulated respectively. Here, the transformer is referred to as the high-speed voltage regulation step down power auto transformer with split windings.

The solution of transient impedance special transformer: the transformer typically generally consists of an AC voltage regulating electronic switch, and a series voltage regulating transformer (may include a transformer switch). The AC voltage regulating electronic switch is connected to the tertiary side of the series voltage regulating transformer, the primary winding of the main transformer of the series voltage regulating transformer is connected to the power grid or power source, the secondary windings of the main transformer and series transformer of the series voltage regulating transformer are connected to an electric power load. A high-speed voltage regulation special auto transformer is derived from the transient impedance special transformer, and a series of special transformer, such as, a transient impedance converting transformer, a high-speed voltage regulation converter auto transformer, a transient impedance furnace transformer, a high-speed voltage regulation furnace auto transformer, a transient impedance traction transformer, a transient impedance voltage-stabilizing and capacity regulation traction transformer and the like are derived from the transient impedance special transformer;

The high-speed voltage regulation special auto transformer is characterized in that: (as showed in FIG. 13) the transformer generally consists of an AC voltage regulating electronic switch, and a series voltage regulating transformer (may include a transformer switch), the AC voltage regulating electronic switch is connected at the tertiary side of the series voltage regulating transformer, and the secondary winding of the main transformer is cancelled. When the electric power load is required to be connected to power grids to step up/down the voltage, the primary winding of the main transformer of the series voltage regulating transformer is connected to the power grid, and the power grid and the electric power load are connected by the secondary winding of the series transformer. The power grid is used as the secondary winding of the main transformer of the series voltage regulating transformer, to step up/down the voltage of the electric power load.

The solution of transient impedance converting transformer: the transient impedance converting transformer is characterized in that: the transformer consists of an AC voltage regulating electronic switch, and a series voltage regulating transformer (may include a transformer switch). And the AC voltage regulating electronic switch is connected to the tertiary side of the series voltage regulating transformer, and the primary winding of the main transformer of the series voltage regulating transformer is connected to the power grid or power source. The secondary windings of the main transformer and series transformer of the series voltage regulating transformer are connected to an electric power load. The description of a split windings or multi-pulse converting transformer is omitted.

The high-speed voltage regulation step down converting auto transformer is characterized in that: the transformer generally consists of an AC voltage regulating electronic switch, and a series voltage regulating transformer (may include a transformer switch). The AC voltage regulating electronic switch is connected at the tertiary side of the series voltage regulating transformer, and the secondary winding of the main transformer is cancelled. When the electric power load is required to be connected to power grids to step up/down the voltage, the primary winding of the main transformer of the series voltage regulating transformer is connected to the power grid, and the power grid and the electric power load are connected by the secondary winding of the series transformer. The power grid is used as the secondary winding of the main transformer of the series voltage regulating transformer, to regulate the voltage of the electric power load. The description of a multi-pulse converting transformer with split windings is omitted.

The solution of transient impedance furnace transformer the transient impedance furnace transformer is characterized in that: the transformer consists of an AC voltage regulating electronic switch, and a series voltage regulating transformer (may include a transformer switch). The AC voltage regulating electronic switch is connected to the tertiary side of the series voltage regulating transformer, and the primary winding of the main transformer of the series voltage regulating transformer is connected to the power grid or power source. The secondary windings of the main transformer and series transformer of the series voltage regulating transformer are connected to an electric power load.

The high-speed voltage regulation furnace transformer is characterized in that: the high-speed voltage regulation furnace transformer generally consists of an AC voltage regulating electronic switch, and a series voltage regulating transformer (may include a transformer switch). The AC voltage regulating electronic switch is connected at the tertiary side of the series voltage regulating transformer, and the secondary winding of the main transformer is cancelled. When the electric power load is required to be connected to power grids to step up/down the voltage, the primary winding of the main transformer of the series voltage regulating transformer is connected to the power grid, and the power grid and the electric power load are connected by the secondary winding of the series transformer. The power grid is used as the secondary winding of the main transformer of the series voltage regulating transformer, to step up/down the voltage of the electric power load.

The solution of transient impedance traction transformer: the transient impedance traction transformer is characterized in that: the transformer consists of an AC voltage regulating electronic switch, and a series voltage regulating transformer. The AC voltage regulating electronic switch is connected to the tertiary side of the series voltage regulating transformer to achieve high-speed loaded and stepped voltage regulation. Take a group formed by connecting YN and d11, the primary winding of the main transformer of the series voltage regulating transformer is connected to the high-voltage power grid, the secondary windings of the main transformer and series transformer of the series voltage regulating transformer are connected to form a structure of d11 which is connected to a railway traction transmission line in a traction changed YN, d11 structure.

When the traction transformer belongs to other groups such as YN, d11, d5 connection group, V, V0 structures with two connected single-phase transformer, a LeBlanc connection transformer, Wood bridge transformer structure, deformed Wood bridge transformer structure, deformed YN, d11 transformer, deformed YN, d11, d5 transformer and the like are usable by changing in this way.

Technical solution of the transient impedance voltage regulator: the transient impedance voltage regulator is characterized in that: the transformer consists of an AC voltage regulating electronic switch and a series voltage regulating transformer (may include a transformer switch). The voltage of the tertiary side of the AC voltage regulating electronic switch is regulated in a stepped or stepless manner in high speed, the primary winding of the main transformer of the series voltage regulating transformer is connected to the power grid, and the secondary winding formed by the main transformer and the series transformer of the series voltage regulating transformer are connected to a resistance, resistance-inductance or resistance-capacitance load. A transient impedance step up auto regulator, or a high-speed voltage regulation step down auto transformer is derived from the transient impedance voltage regulator. The AC voltage regulating electronic switch has functions of high-speed stepless voltage regulation and high-speed stepped voltage regulation. When they are combined, the output voltage waveform can be infinitely close to a sine wave. The transformer when applied to the stepless voltage regulation system is referred to as the voltage regulator.

The transient impedance step up auto transformer is characterized in that: the transformer consists of an AC voltage regulating electronic switch and a series voltage regulating transformer. The primary winding of the main transformer of the series voltage regulating transformer is connected to the power grid, and the secondary winding of the main transformer is cancelled, the voltage of the tertiary side is regulated in a stepped or stepless manner in a high speed by using the AC voltage regulating electronic switch. The power grid (or power source) and the electric power load are connected by the secondary winding of the series transformer, the power grid (or power source) is used as the secondary winding of the main transformer of the series voltage regulating transformer, to regulate the voltage of the resistance, resistance-inductance or resistance-capacitance electric power load.

The high-speed voltage regulation step down auto transformer is characterized in that: the transformer consists of an AC voltage regulating electronic switch and a series voltage regulating transformer (may include a transformer switch). The primary winding of the main transformer of the series voltage regulating transformer is connected to the power grid, and the secondary winding of the main transformer is cancelled. The voltage of the tertiary side of the AC voltage regulating electronic switch is regulated in a stepped or stepless manner in a high speed, the power grid (or power source) and the electric power load are connected by the secondary winding of the series transformer. The power grid (or power source) is used as the secondary winding of the main transformer of the series voltage regulating transformer, to regulate the voltage of the resistance, resistance-inductance or resistance-capacitance electric power load.

Technical solution of the transient impedance power source transformer: the transient impedance power source transformer is characterized in that: the transformer consists of an AC voltage regulating electronic switch and a series voltage regulating transformer (may include a transformer switch). The voltage of the tertiary side of the AC voltage regulating electronic switch is regulated in a stepped manner in a high speed. The primary winding of the main transformer of the series voltage regulating transformer is connected to the power source, and the secondary winding formed by the main transformer and the series transformer of the series voltage regulating transformer are connected to a resistance, resistance-inductance or resistance-capacitance load, a high-speed voltage regulating power source auto transformer is derived from the transient impedance power source transformer.

The transient impedance step up power source auto transformer is characterized in that: the transformer consists of an AC voltage regulating electronic switch and a series voltage regulating transformer (may include a transformer switch). The primary winding of the main transformer of the series voltage regulating transformer is connected to the power source, and the secondary winding of the main transformer is cancelled. The voltage of the tertiary side of the AC voltage regulating electronic switch is regulated in a stepped or stepless manner in a high speed. The power source and the electric power load are connected by the secondary winding of the series transformer. The power source is used as the secondary winding of the main transformer of the series voltage regulating transformer, to regulate the voltage of the resistance, resistance-inductance or resistance-capacitance electric power load.

The high-speed voltage regulation step down power source auto transformer and the high-speed voltage regulation step down auto transformer are characterized in that: the transformer consists of an AC voltage regulating electronic switch, and a series voltage regulating transformer (may include a transformer switch), the primary winding of the main transformer of the series voltage regulating transformer is connected to the power source (or power grid), the secondary winding of the main transformer is cancelled. The voltage of the tertiary side is regulated in a stepped or stepless manner in a high speed by using the AC voltage regulating electronic switch. The power grid is powered by the secondary winding of the series voltage regulating transformer, to regulate the voltage of the resistance, resistance-inductance or resistance-capacitance electric power load.

Technical solution of the high-speed voltage regulating transformer: the high-speed voltage regulating transformer consists of an AC voltage regulating electronic switch and any types of transformers. The AC voltage regulation switch acts on the primary side of the transformer, and the transformer uses the AC voltage regulating electronic switch as a loaded voltage regulation switch. Such a transformer is referred to as a high-speed voltage regulating transformer. But at the present, the transformer may only utilized on low-voltage and low-capacity transformers due to performance of semiconductor components.

The technical solution of power grid connection technology type of a transient impedance transformer: the power grid connection method type of a transient impedance transformer is characterized in that: the transient impedance transformer constituted by an AC voltage regulating electronic switch and a series voltage regulating transformer, and the power grid connection technology. The AC voltage regulating electronic switches are connected to the tertiary side of the series voltage regulating transformer. The primary winding of the main transformer of the series voltage regulating transformer is connected to the first power grid, and the secondary windings of the main transformer and series transformer of the series voltage regulating transformer are connected to the second power grid. And a power grid connection method type of a transient impedance power transformer with split windings, a power grid connection method type of a transient impedance step up auto transformer, and a power grid connection method type of a transient impedance step up auto transformer, and the like are derived from the power grid connection method type of a transient impedance power transformer.

The power grid connection method type of a transient impedance power transformer with split windings is characterized in that: the secondary windings of the main transformer of the series voltage regulating transformer is split into two windings (the first type of transient impedance power transformer with split windings), or the series transformer is divided into two transformers (the second type of transient impedance power transformer with split windings), which are referred to as a secondary winding (1), and a secondary winding (2). When the first power grid, the second power grid and the third power grid are required to be connected, the primary winding of the main transformer of the series voltage regulating transformer is connected to the first power grid, the secondary winding (1) is connected to the second power grid, the second winding (2) is connected to the third power grid. If the second power grid and the third power grid need voltage regulation respectively, the series transformer is divided into two transformers, and then the voltage regulation winding is split into two windings. At this time, two AC voltage regulating electronic switches are required to be connected to the two voltage regulation windings of the series voltage regulating transformer, respectively. The primary windings of the series transformer are powered by the two voltage regulation windings of the main transformer. By regulating different switches, the voltages of the second power grid and the third power grid are regulated respectively. Here, the transient impedance transformer is referred to as the split transient impedance power transformer. As the secondary winding of the series transformer of the series voltage regulating transformer is divided into two secondary windings, when the series transformer is divided into two transformers, as the transient impedance technology can be applied to the two secondary windings respectively, a power grid will be less influenced if the other power fails.

The power grid connection method type of a transient impedance step up auto transformer are characterized in that: it is applied to a step up power grid system, and consists of an AC voltage regulating electronic switch and a series voltage regulating transformer (FIG. 14). The secondary winding of the main transformer is cancelled, and the AC voltage regulating electronic switch is connected at the tertiary side of the series voltage regulating transformer. When the first power grid (at lower voltage) and the second power grid are required to be connected to step up the voltage, the primary winding of the main transformer of the series voltage regulating transformer is connected to the first power grid, the first power grid and the second power grid are connected by the secondary winding of the series transformer. The first power grid acts as the secondary winding of the main transformer of the series voltage regulating transformer to regulate the voltage of the second power grid.

The power grid connection method type of transient impedance step up auto transformer with split windings is characterized in that: when applied to a step up power grid system, the transformer consists of an AC voltage regulating electronic switch and a series voltage regulating transformer. The secondary winding of the main transformer is cancelled, and the secondary winding of the series transformer of the series voltage regulating transformer is split into two secondary windings, or the series transformer is divided into two transformers, which are referred to as a secondary winding (1), and a secondary winding (2). When the first power grid (lower voltage), the second power grid and the third power grid are required to be connected, the primary winding of the main transformer of the series voltage regulating transformer is connected to the first power grid, the secondary winding (1) is connected between the second power grid and the first power grid, and the second winding (2) is connected between the third power grid and the first power grid. If the second power grid and the third power grid need voltage regulation respectively, the series transformer may be divided into two transformers, and then the voltage regulation winding is divided into two windings. At this time, two AC voltage regulating electronic switches are required to be connected to the two voltage regulation windings of the series voltage regulating transformer. The primary windings of the series transformer are powered by the two voltage regulation windings of the main transformer. By regulating different switches, the voltages of the second power grid and the third power grid are regulated respectively. Here, the transient impedance transformer is referred to as the transient impedance step up power auto transformer with split windings. As the secondary winding of the series transformer of the series voltage regulating transformer is divided into two secondary windings, when the series transformer is divided into two transformers, as the transient impedance technology can be applied to the two secondary windings respectively, a power grid will be less influenced if the other power fails.

The power grid connection method type of a high-speed voltage regulation step down auto transformer is characterized in that: it has the same structure to that of the power grid connection method type of a transient impedance step up auto transformer, but it is applied to a power grid step down connecting system.

The power grid connection method type of a high-speed voltage regulation step down auto transformer with split windings is characterized in that: it has the same connection method to that of the power grid connection method type of a transient impedance step up auto transformer with split windings, but it is applied to a power grid step down connecting system.

The technical solution for connection technology of reactive compensation devices: the reactive compensation devices connected in series or parallel to the end port of the secondary side (constant voltage end) of the main transformer of the series voltage regulating transformer is characterized in that (its location is showed in FIG. 12): when the present invention is required to be applied to a voltage stabilizing system, a voltage regulation system, a high voltage power grid system, and when the reactive compensation devices are required to be connected to achieve reactive compensation, the reactive compensation devices can be connected in series or parallel to the end port of the secondary outgoing wire of the main transformer of the series voltage regulating transformer.

The reactive compensation devices connected in series or parallel to basic winding at tertiary side (the tertiary side may be disconnected) of the main transformer of the series voltage regulating transformer, characterized in that (its location is showed in FIG. 12): when the present invention is required to be applied to a voltage stabilizing system, a voltage regulation system, a high voltage power grid system, and when the reactive compensation device is required to be connected in series or parallel to achieve reactive compensation, the reactive compensation device can be connected in series or parallel to basic winding at tertiary side (the tertiary side may be disconnected) of the main transformer of the series voltage regulating transformer.

The reactive compensation device is characterized in that it can be formed as a single-phase or three-phase structure by capacitors (or paralleling reactors), and use mechanically or thyristor to control the switching function. It can also be a static reactive compensation device (SVC), and other reactive compensation methods are not described in details.

ADVANTAGEOUS EFFECTS

The new AC voltage regulator has advantageous effects that: the new AC voltage regulator is the foundation of AC voltage regulating electronic switches, and it is one of the simplest AC voltage regulating electronic switch. As compared with the output waveform of conventional AC voltage regulators, the waveform output by the AC voltage regulator of the present invention is relatively in close to sine wave, achieving lowest effect on the device. Thus, in resistive, resistive-inductance, and resistive-capacitive AC load systems, the application can achieve voltage smoothly stepless regulation in high speed, and the range of continuous voltage regulation is 0-100%, which has advantages of readily achieving facility automation, high power factor, low power loss, small harmonics, without voltage interrupted region, and continuous current. The new AC voltage regulator can be applied in high voltage classes and large capacity, and can achieve stepless voltage regulation and stepped voltage regulation, but it should be applied to a series circuitry with more than one voltage regulating transformer (or voltage regulating power source) connected with more than one transformer (power grid, or power source). The application of the new AC voltage regulator breaks through the limits on voltage classes and capacities of conventional AC voltage regulator, and extends the application thereof to high voltage and ultra-high voltage systems.

The AC voltage regulating electronic switch has advantages that: it resolves the problems that conventional contactor switches are easy to generate arc, incapable of stepless voltage regulation, incapable of response in a high speed, high maintenance cost, cumbersome volume, complex structure, high accident rate, and excessive costs in split-phase voltage regulation. The AC voltage regulating electronic switch (it is preferred to eliminate capacitor discharge when the current of the voltage regulator circuitries is crossing the zero point) has functions of reversing change-over voltage regulating, linear regulation, coarse-fine regulation, and can achieve stepless voltage regulation, and stepped voltage regulation, or arbitrarily switching between stepped voltage regulation and stepless voltage regulation in a high speed. It can be applied to low-voltage and high-current systems and achieve high-speed response, and can be embodied as intelligent control, no electric arc, corrosion resistance and lower costs. As for application in dry type transformers, it has great significance to be embodied as a switch without electric arc and noise which can be controlled in a high speed and is corrosion resistant. The AC voltage regulating electronic switch may be applied to small and medium size transformers as well as giant transformer and ultra-high voltage transformer.

The advantageous effects of the series voltage regulating transformer: the total capacity of the whole series voltage regulating transformer may be controlled by only controlling the capacity of the series transformer by the AC voltage regulating electronic switch, and the output voltage of the total capacity of the whole series voltage regulating transformer may be changed by changing the voltage of series transformer. Even if the range of voltage regulation is 100%, the capacity of the series transformer is only half of the total capacity of the transformer, and in principle, the voltage and current of the voltage regulation winding may be combined arbitrarily. That is, the voltage and current of the AC voltage regulating transformer are free to choose, which is convenient for choosing a safe and cheap AC voltage regulator. Secondly, as the series voltage regulating transformer consists of a main transformer and a series transformer, in high, especially, ultra-high systems, the capacity of the transformer may be divided into two parts, one part for the ultra-high transformer, and the other part is for lower voltage transformer. As the voltage class of the lower voltage transformer part is greatly lowered, the manufacturing costs are saved. Thirdly, the series transformer part adopts variable magnetic flux voltage regulation, and may change the capacity of the transformer.

The advantageous effects of the transient impedance technology: the secondary voltage of the series voltage regulating transformer is controlled by using the AC voltage regulating electronic switch, or by arranging the polarities of two in-phase secondary windings to be opposite, the coil is changed into an inductance coil with two windings which are connected in series and have opposite polarities. The secondary side winding of the transformer is changed into a reactance coil instantly, and by regulating the voltage of the secondary winding of the series transformer, the reactance voltage drop of the transient impedance transformer is regulated to a predetermined level in a high speed. In principle, the reactance voltage drop of the system may be close to 100%.

By controlling the reactance voltage of the transformer, the reactance of the system will tend to a predetermined level in emergency, or the secondary voltage becomes close to 0, but not equal to 0 (when regulating the voltage to a level next higher than 0 by stepped regulation, stepless voltage regulation can be used for making the secondary voltage close to 0, but not equal to 0), make the short-circuit current under control, but not interrupting the current, thereby maintaining the secondary system stable under any emergencies The advantageous effects of the transient impedance transformer: the transient impedance technology and high-speed voltage regulation technology according to the present invention may be applied to high voltage or ultra-high voltage power grid power transmission and power grid reactive power control as well as high-speed voltage regulation, safety protection, energy conservation and safety protection of AC/DC smelting systems, energy conservation and safety protection of DC electrolysis systems, and safety protection of electric traction locomotives, and reactive compensation of secondary or tertiary side, and may control the system with intelligent control by the transformer, achieve voltage stability control, control the load imbalance of each phase in a high speed, achieve high-speed smooth stepless voltage regulation as well as high-speed stepped and high-speed stepless voltage regulation, may exempt the transformer from maintenance, adjust the capacity of the transformer, and can be applied to circumstances requiring fire protection. It is the greatest advantage of the transient impedance transformer to replace the primary side disconnection in prior art by tertiary side disconnection in high voltage or ultra-high voltage power grid.

The advantageous effects of the transient impedance power transformer in high voltage or ultra-high voltage power grid: the application of the transient impedance technology and high-speed voltage regulation technology according to the present invention in power grid provides important guarantee for power grid safety, keeps the electric power system stable in any emergencies, and meanwhile, the reactive power of the system is greatly reduced by the operation of low-impedance transformer in the power grid, and the transmission capacity and transmission distance of the AC power grid is increased. The economical efficiency as well as energy consumption of power transmission is improved. Save floor space for transmission corridors and floor space for transformer substation. The problem of chain reaction in case of accidence in high-voltage power grid may be prevented. It facilitated to network topographies and simplifies the structure of the power grid, and can replace the primary side disconnection by tertiary side switch part. The problem of stability and reliability in high voltage and ultra-high power transmission systems may be resolved. The costs of the transformer are saved by replacing Cu by Al. By regulating the transformer in a high speed, the power grid may be controlled safely, efficiently, synchronously and intelligently. The transient impedance technology can be applied to the two secondary windings respectively, thus a power grid (electric power load) will be less influenced when the other power (the other electric power load) fails. Reactive compensation may be applied to tertiary side, so as to save costs greatly. By achieving "current tipping" in a high speed, the requirements on accuracy, speedability and frequent regulation of current control by power system are met.

The advantageous effects of application of transient impedance converting transformer in high voltage DC power transmission system are: lower transmission line costs, lower power loss per year, and saving energy and reducing consumption. As the application of transient impedance technology and high-speed voltage regulation technology according to the present invention in the power grid, the problems of system stability and high-speed regulation are solved, and it is possible to achieve nonsynchronous interconnection of the power grid. The short-circuit current is limited by a converting transformer. By regulating the transformer in a high speed, the power grid may be controlled efficiently and intelligently, in a high speed, and reliably. There is no capacitor charging current. Floor space of the corridors is saved. The converter device has lower price, and generate weaker harmonic influence, and the capacity of the filter is lowered. By endowing the converting transformer with phase controlling function and high-speed regulation function of the converter device, the converter device may be embodied as a semi-controlled converter device or the thyristor is replaced by a diode directly, alleviate overheat of the capacitor and generator, and attenuate interference of unstable converter control on communication systems. The converter device expends less reactive power, and may conduct reactive compensation in place at secondary side or tertiary side of the converting transformer (the compensation solution is described hereafter). A part of functions of the DC high voltage circuitry breaker is achieved by the converting transformer. Sub-synchronous oscillation of the electric power system and the like are suppressed. The control on bridge in DC power transmission protection is changed into the control on transformer. Split-phase voltage regulation and shunt voltage regulation may be applied, i.e., in a multi-terminal power supply system, various systems may be regulated in voltage in a high speed, and in capacity in a high speed respectively. When a method of splitting series transformer is used for controlling a certain supply terminal in a sudden short circuit or other emergencies case, the influence on other supply terminals is very weak. Reactive compensation may be applied to tertiary side, so as to save costs greatly. The application of the transient impedance technology and high-speed voltage regulation technology according to the present invention in power grid provides important guarantee for power grid safety, keeps the electric power system stable in any emergencies.

The advantageous effects of application of the transient impedance converting transformer in the rectification system: as the transient impedance technology and high-speed voltage regulation technology, high-speed stepless voltage regulation technology according to the present invention applied to the system, the existing average current control scheme may be replaced by constant current control scheme, and the fine regulation of reactors may be replaced. As for each phase of the transformer, the voltages of various units may be finely regulated, and thus the currents among various parallel rectifier units, as well as three phases, are balanced. The problems of high-speed voltage regulation in loaded switches, and loaded switches incapable of voltage regulation in high frequency are solved, i.e., even if the range of voltage regulation is large, the high-speed response of the switches may synchronize with the time when the electrolytic current changes. The rectifying device is cheap, generate weak harmonic influence. By endowing the rectification transformer with phase controlling function and high-speed voltage regulation function of the converter, the rectification device may be embodied as a semi-controlled converter device or the thyristor is replaced by a diode directly. The rectifying device is fast in voltage regulation, and may achieve split-phase voltage regulation. In three-phase short circuit, the rectifying device may operate very fast, and make the impedance of the transformer increase, thereby ensuring the stability of the system. The rectifying device may achieve saving energy and reducing consumption. The rectifier transformer may control the system with intelligent control efficiently in a high speed. The application of the transient impedance technology and high-speed voltage regulation technology according to the present invention in power grid provides important guarantee for system safety, keeps the system stable in any emergencies.

The advantageous effects of application of the transient impedance furnace transformer in the AC/DC electric furnace smelting system: as the transient impedance technology and high-speed voltage regulation technology, high-speed stepless voltage regulation technology according to the present invention applied to the system, voltage regulation and current regulation in furnace of electric-arc furnace and submerged arc furnace system may be achieved without electrodes regulation. In three-phase short circuit situation, the rectifying device may operate very fast, and make the impedance of the system increase, thereby ensuring the stability of the system. The rectifying device has short response time. The rectifying device saves energy and reduces consumption. By using split-phase voltage regulation, imbalance in three-phase power can be resolved. The rectifying device may adjust capacity, generate weak harmonic influence, and compensate filter at secondary side or tertiary side in a reactive compensation manner, thereby reduce ultra harmonics. The furnace transformer may control the system with intelligent control safely and efficiently in a high speed. The three-phase system voltage (electrode voltage) may be symmetrical, thereby reducing third harmonic, stabilizing melting power, eliminating reactive current flowing between electrodes, and decreasing power consumption of the furnace. The application of the transient impedance technology and high-speed voltage regulation technology according to the present invention in power grid provides important guarantee for system safety, keeps the system stable in any emergencies.

The advantageous effects of application of the present invention in the DC traction, AC traction or AC/DC traction systems: as the transient impedance technology and high-speed voltage regulation technology according to the present invention applied to the system, as for each phase of the transformer, the voltages of various units may be finely regulated, and thus the currents among various parallel rectifier units, as well as three phases, are balanced, and especially, in split-phase voltage regulation, only the structure of the series transformer, not the main transformer, is changed. As the range of voltage regulation of the traction transformer is small, the capacity of the series transformer is not large, and the voltage class is 27.5 KV, there is little influence on costs. The high-speed response of the AC voltage regulating electronic switch may synchronize with the time when the load current changes. The rectifying device is cheap, generate weak harmonic influence. By endowing the rectification transformer with phase controlling function and high-speed regulation function of the converter, the rectification device may be embodied as a semi-controlled converter device or the thyristor is replaced by a diode directly. In a certain range, the rectifying device may adjust capacity, increase capacity, and stabilize voltage in a high speed. In three-phase short circuit, the rectifying device may operate very fast, and make the impedance of the transformer increase, thereby ensuring the stability of the system. The rectifying device may achieve saving energy and reducing consumption. The rectifier transformer may control the system with traction control efficiently in a high speed.

The advantageous effects of application of the present invention in the system requiring stepless voltage regulation: as the transient impedance technology and high-speed voltage regulation technology, high-speed stepless voltage regulation technology according to the present invention applied to the system, the range of voltage regulation of the voltage regulator may be 0 to 100%, the capacity and voltage class may be the same as that of the existing transformer. The stepless voltage regulation has great breakthrough in capacity, voltage classes, waveform deviation factor and other aspects, and has great influence on the industry which has great requirements on stepless voltage regulation devices, such as, vacuum furnace, scientific experiment and the like.

The advantageous effects of application of the present invention in power source system: as for high, precise and advanced loads, safe, high-speed, synchronized and intelligent control may be possible.

The advantageous effects of application of the present invention in the reactive compensation system: in a scheme that the low-voltage or tertiary side is directly connected to the reactive compensation device in parallel, the effect of saving energy and reducing consumption is the best in all the schemes. It is an urgent needed technology to connecting the reactive compensation device with low-voltage device in parallel in a system with variable secondary voltage. In tertiary side compensation in a high voltage or ultra-high voltage system, the high voltage reactive compensation device may be replaced by a low-voltage reactive compensation device, so that the costs of the reactive compensation device are greatly decreased, and its reliability is greatly improved.

Wherein: 1. constant voltage power source (or sine wave power source); 2. AC voltage regulator; 3. primary winding of a new AC voltage regulator; 4. secondary winding of a new AC voltage regulator; 5. basic coil; 6. voltage regulation coil; 7. AC voltage regulating electronic switch; 8. reversing change-over AC voltage regulating electronic switch; 9. coarse regulating AC voltage regulating electronic switch; 10. fine regulating AC voltage regulating electronic switch; 11. structure of secondary winding of main transformer of series voltage regulating transformer of splayed coil; 12. structure of secondary winding of series transformer of series voltage regulating transformer of splayed coil; 13. series voltage regulating transformer voltage regulation coil; 14. primary coil of the main transformer of the series voltage regulating transformer; 15. secondary coil of the main transformer of the series voltage regulating transformer; 16. portions not showed by coils; 17. primary coil of the series transformer of the series voltage regulating transformer; 18. secondary coil of the series transformer of the series voltage regulating transformer; 19. power grid; 20. load; 21. power grid; 22. schematic diagram showing locations for reactive compensation; 23. basic winding for tertiary side disconnection; 24. short circuit switch; 25. tertiary side load circuitry breaker.

The above figures are illustrated in single phase, and the three phases is in a similar way. In principle, other connection methods and connection positions of the AC voltage regulator may be combined with the connection method of the transformer arbitrarily, which are not illustrated wholly.

DETAILED DESCRIPTION OF THE EMBODIMENTS

Example 1

In the present solution, the AC voltage regulating electronic switch is not used, but a new AC voltage regulator is used, which is aimed at showing the capability of voltage regulation of the AC voltage regulator under extreme cases. A furnace, resistance-inductive load, is provided, when the distance from the electrode to the burden surface is determined, the maximal and minimal output voltages of the series voltage regulating transformer is required to be between 1 and 0.7, respectively.

A furnace transformer, three phases, is provided, and a series voltage regulating transformer, with range of voltage regulation of 30% and positive voltage regulation, is also provided, the main transformer and the series transformer are of an Yd11 connection group. The output constant voltage at lower voltage of the main transformer is $U_1=0.7$, and the highest output voltage at lower voltage of the series transformer is $U_2=0.3$. The high voltage and current of the series transformer can be combined arbitrarily, as long as the capacity thereof is equal to the capacity of the series transformer.

Figure 1:
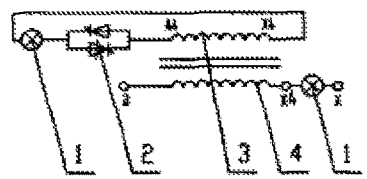
FIG. 1 is a schematic diagram showing the principle of a new AC voltage regulator.
Figure 2:
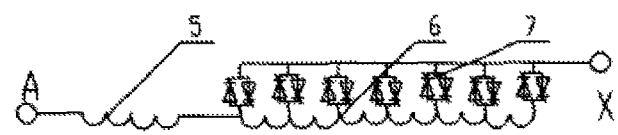
FIG. 2 is a schematic diagram showing the principle of a linear regulating AC voltage regulating electronic switch.
Figure 3:
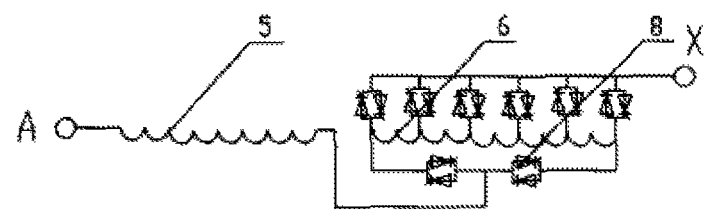
FIG. 3 is a schematic diagram showing the principle of a reversing change-over AC voltage regulating electronic switch.
Figure 4:
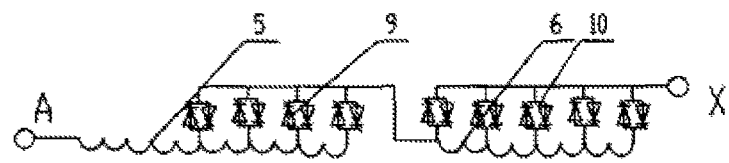
FIG. 4 is a schematic diagram showing the principle of a coarse-fine regulating AC voltage regulating electronic switch.
Figure 5:
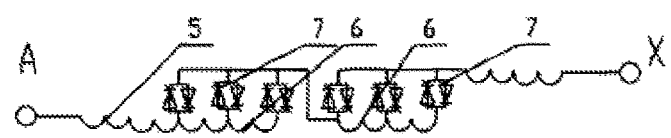
FIG. 5 is a schematic diagram showing the principle of an intermediate regulating AC voltage regulating electronic switch.
Figure 6:
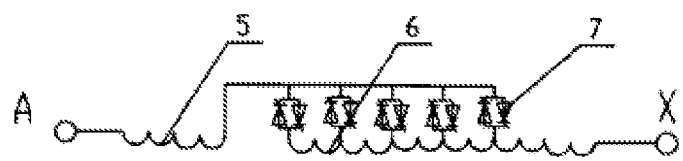
FIG. 6 is a schematic diagram showing the principle of an intermediate regulating AC voltage regulating electronic switch.
Figure 7:
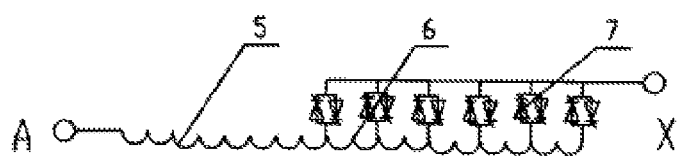
FIG. 7 is a schematic diagram showing the principle of an end portion regulating AC voltage regulating electronic switch.
Figure 8:
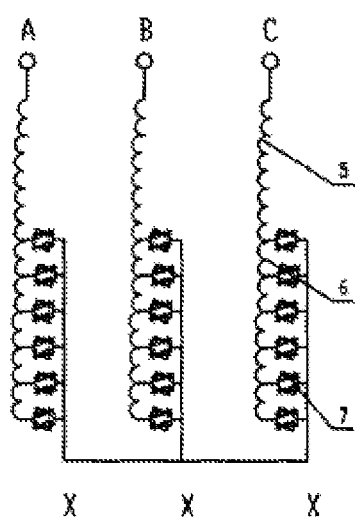
FIG. 8 is a schematic diagram showing the principle of a neutral point regulating AC voltage regulating electronic switch.
Figure 9:
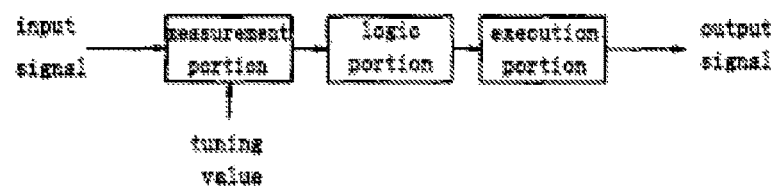
FIG. 9 is a schematic diagram showing the principle of a measuring and control device.
Figure 10:
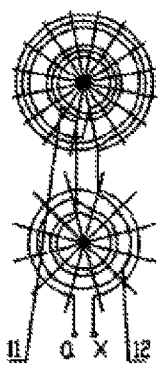
FIG. 10 is a schematic diagram showing the principle of a splayed coil structure.
Figure 11:
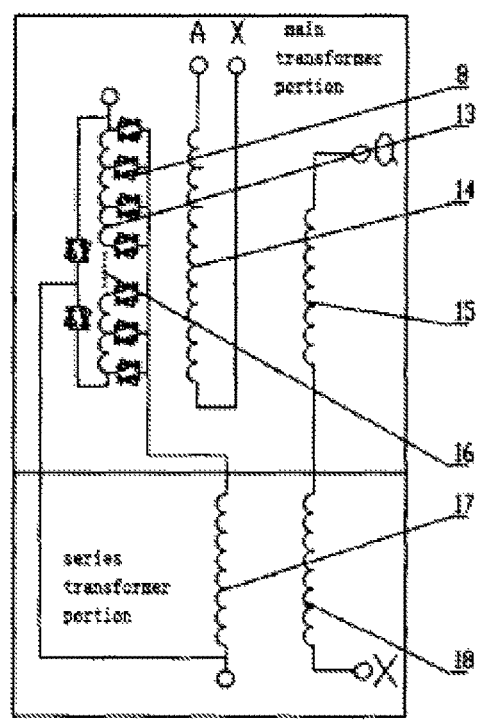
FIG. 11 is a schematic diagram showing the principle of a single phase series voltage regulating transformer (one of which is showed, the rest are omitted).
Figure 12:
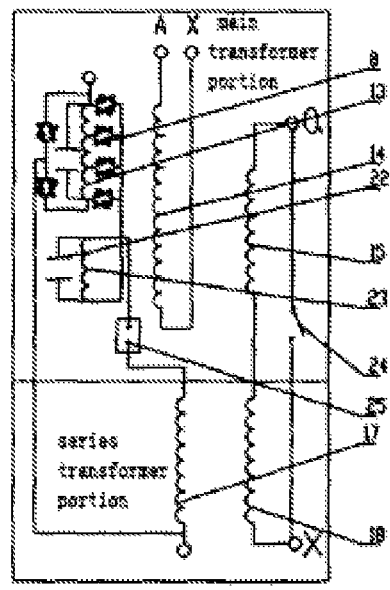
FIG. 12 is a structure diagram showing the principle of tertiary side disconnection (the schematic diagram of location of the two compensation method, only one of which is need in compensation).
Figure 13:
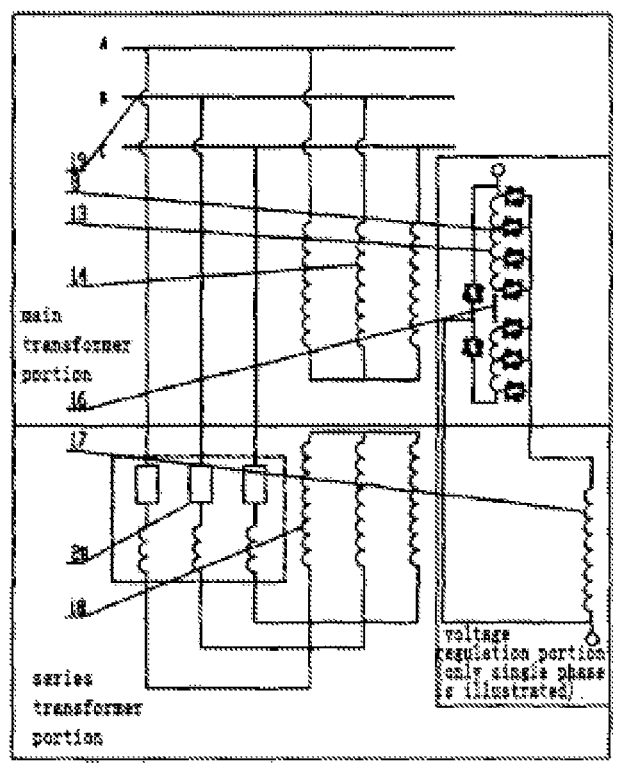
FIG. 13 is a schematic diagram showing the principle of a high-speed voltage regulation special auto transformer.
Figure 14:
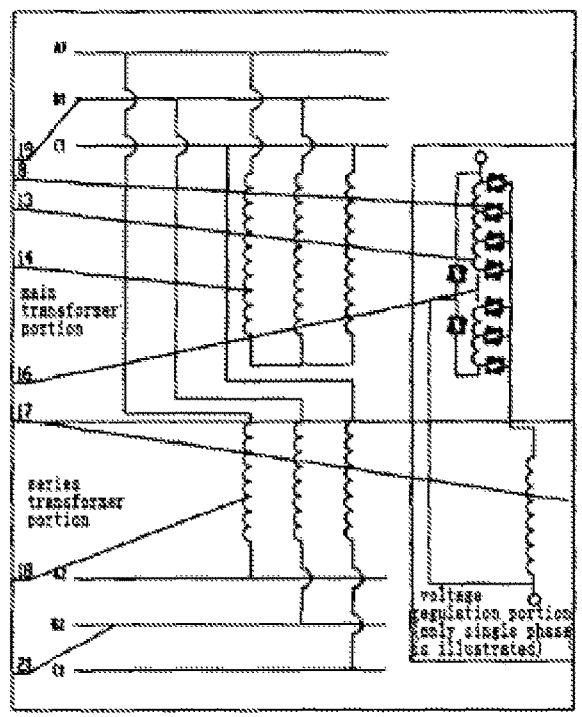
FIG. 14 is a schematic diagram showing the principle of a power grid connection method type of a transient impedance step up auto transformer.
Figure 15:
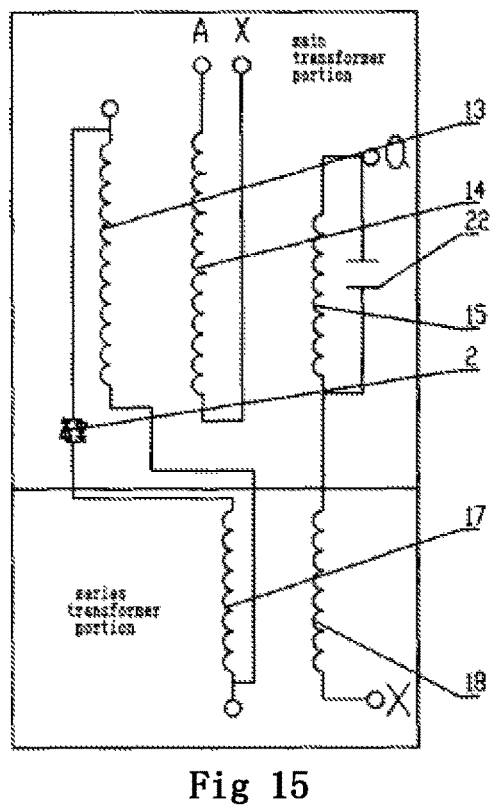
FIG. 15 is a schematic diagram showing the principle of a series voltage regulating transformer phase controlled by an AC voltage regulator.

An AC voltage regulator is provided, a three-phase AC voltage regulator is connected in a manner of Y, the voltage of the semiconductor is defined as the phase voltage of the tertiary side system multiplied by a correlation coefficient as defined in its specification, the current effective value is 2 or 3 times of the tertiary side current of the series voltage regulating transformer (determined by total impedances), the delay angle of the thyristors is defined as $\alpha$, the conduction angle of the thyristors is defined as $\theta$, and the impedance angle of the system is defined as $\delta$, and is activated by a broad pulse or pulse trains. The principle of the single-phase electrical wiring is showed in FIG. 15 (there is no reversing change-over switch in the present example), and the three-phase wiring graph is combined as Y and d11, the principle thereof is not illustrated herein.

When the system needs the maximal voltage, the control angle of the thyristor $\alpha \leq \delta$, the output voltage of low voltage side of the transformer is $U=U_1+U_2=0.7+0.3=1$. When the system needs the lowest voltage, the control angle of the thyristor $\alpha=180°$, i.e., $U_2=0$, and the output voltage of low voltage side of the transformer $U=U_1=0.7$. When the system needs other voltage, the control angle of the thyristor $\alpha=0$, $\delta \leq \theta \leq 180°$, and the output voltage of low voltage side of the transformer $U=0.7\sim1$.

Example 2

Figure 16:
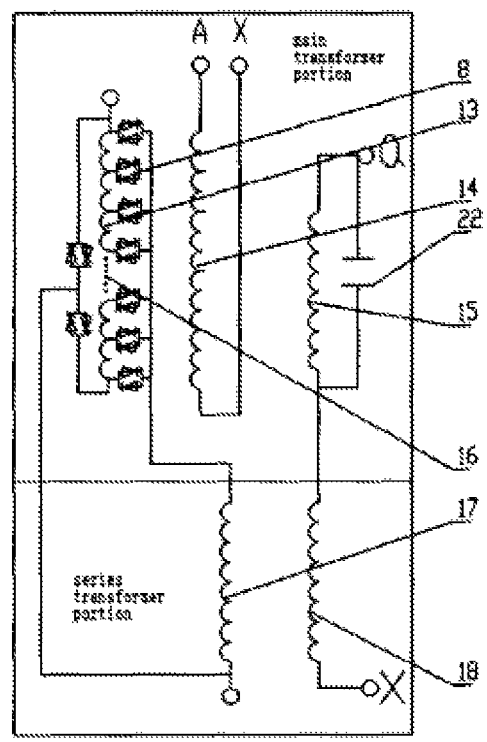
FIG. 16 is a schematic diagram showing the principle of a transient impedance furnace transformer.
Figure 17:
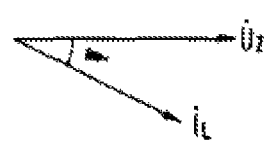
FIG. 17 is a vectogram showing the current before compensation.
Figure 18:
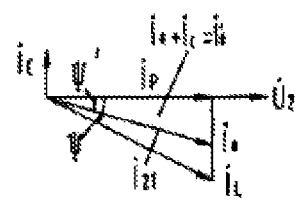
FIG. 18 is a vectogram showing the current after compensation.

A furnace transformer with range of voltage regulation of 40%, reversing change-over voltage regulating, Yd11 connection group, and a series voltage regulating transformer are provided. The secondary winding of the main transformer is connected, in parallel, to the capacitor group to adjust the power factor. Before compensation, $\cos \varphi=0.8$, it is required that after compensation, cos φ=0.95. The principle of electrical wiring is showed by the combination form of the low-voltage winding and the reactive compensation device, as showed in FIG. 16. $U_{21}$ and $U_{22}$ are secondary voltages of the main transformer, and series transformer, respectively, and the leakage reactance of the transformer is omitted. FIG. 17 is a vectogram showing the current before compensation. Before compensation, the power factor is defined as cos φ=0.8, sin φ=0.6, and meanwhile, the working current of the furnace $I_L$=1. The active component of the working current is $I_R$=0.8. The idle component of the working current is $I_Q$=0.6. Both the currents flowing through the secondary winding of the main transformer and the series transformer are working current $I_L$ of the furnace. FIG. 18 is a vectogram showing the current after compensation. As the compensation (capacitance) current only flow through the secondary winding of the main transformer, it is assumed that the vector angle between the magnitude of the current of the secondary winding of the main transformer after compensation and its voltage $U_{21}$ will be changed.

It is assumed that the working current of the furnace after compensation is still $I_L$=1, and the power factor of the secondary winding of the main transformer after compensation is 0.95.

The current in the secondary winding of the main transformer is changed to $I_{21}$=0.842. The current flowing through the compensation capacitor is $I_C$=0.3374. The secondary capacity of the main transformer after compensation is $SN_{21}$=0.842 (it is assumed that the secondary voltage of the main transformer is $U_{21}$=1). The decreased value of the secondary capacity of the main transformer after compensation is $\Delta SN_{21}$=0.158. The capacity of the required compensation capacitor should be $S_C$=0.3374.

The electromagnetic capacity required by the secondary winding of the main transformer after compensation is about 84.2% of that before, and thus the capacity of the primary winding of the main transformer is decreased correspondingly. As the range of voltage regulation is 40%, and may be of a reversing change-over form, the capacity of the transformer before compensation is $SN_1$.

$SN_1$—capacity of the transformer before compensation. $SN_{11}$—capacity of the main transformer before compensation is $0.8SN_1$. $SN_{12}$—capacity of the series transformer before compensation is $0.2SN_1$. $SN_1=SN_{11}+SN_{12}=0.8SN_1+0.2SN_1$. The capacity of the transformer after compensation is $SN_2$—the capacity of the transformer after compensation. $SN_{21}$—the capacity of the main transformer after compensation. $SN_{22}$—the capacity of the series transformer after compensation.

$$SN_2=SN_{21}+SN_{22}=0.8SN_1\times 0.842+0.2SN_1=0.8736SN_1$$

It can be seen that, the capacity of the whole device after compensation is improved by about 12.5%, i.e., the active power is improved.

Example 3

A furnace transformer with range of voltage regulation of 40%, reversing change-over voltage regulating, Yd11 connection group, and a series voltage regulating transformer are provided. The low voltage of the main transformer is 0.8, the low voltage of the series transformer is 0~0.2, the combined voltage of the main and series transformers is 0.8±(0~0.2), with 21 levels of voltage regulation, each of which is 0.02, the capacity of the main transformer is 0.4~1, and the tolerance of each level of the main transformer is 0.03. It is assumed that the ratio of transformation is 1, and the resistance values of the two windings of the low-voltage main and series transformers are the same. It is assumed that the working current of the furnace after compensation is still $I_L$=1, and the current of the secondary winding of the main transformer is $I_{21}$=0.842, and the no-load loss is about of 15% of the load loss.

As showed in Example 2: loss of the transformer Pk is $$Pk=(0.842I_L)^2\times 0.8\times R+(I_L)^2\times 0.2\times R=0.767(I_L)^2\times R$$

That is, the energy conservation and consumption reduction of the load of the transformer is about 23%.

As the no-load loss is about 15% of the load loss. The total loss ratio of the transformer after and before the regulation of the power factor is: $(0.767 I_L)^2R+0.15(I_L)^2R)/1.15(I_L)^2R=0.797(I_L)^2R$. That is, the total energy conservation and consumption reduction of the transformer is about 20%.

INDUSTRIAL UTILITY

The application of the transient impedance technology and high-speed voltage regulation technology, high-speed stepless voltage regulation technology according to the present invention in a high voltage or ultra-high voltage AC-DC power transmissions system, an AC/DC furnace smelting system, an electrochemically electrolytic industry system, a electric power locomotive traction system, a reactive compensation system, and a high-power stepless voltage regulation is beneficial to safety protection and high efficiency synchronous intelligent control of the associated system.

When the present invention is applied to resistive, resistive-inductive, and resistive-capacitive load systems requiring stable control, or requiring capacity regulation of the transformer, or requiring high-speed control of characteristics of each phase unbalanced load and other characteristics, the transient impedance transformer may be used to control its feature in a high speed.

The present invention may be used to improve the stability and reliability of the high voltage or ultra-high voltage power system, reduce system short circuit capacity, reduce equipment investment, reduce voltage fluctuation and flickering, the high voltage circuitry breaker may be replaced by the tertiary side disconnection function, and the transformer has obvious effects of regulating system impedance in a high speed and improve the power factor of the system per se.

The stepless voltage regulation has great breakthrough in capacity, voltage classes, waveform deviation factor and other aspects, and has great influence on the industry which has great requirements on stepless voltage regulation devices, such as, vacuum furnace, scientific experiment and the like.

The stepless voltage regulation may be applied to fields of industrial and agricultural production, scientific experiment, communication and transportation, telecommunication transmission, national defense, health care, power transmission. So to speak, the transient impedance transformer plays a role in various industry of national economy.

The invention claimed is:
1. A series voltage regulating transformer, comprising:
   a main transformer portion including a first primary winding, a voltage regulating winding, and one or more first secondary windings, and
   a series transformer portion including a second primary winding and one or more second secondary windings,
   wherein, each of the first primary winding or the first secondary winding is connected, in series, to each of the second secondary windings, respectively, and the voltage regulating winding is connected to the second primary winding, and wherein the output voltage of the series voltage regulating transformer is equal to a voltage of the first primary winding or the first secondary winding of the main transformer portion plus or minus a voltage of the second secondary winding of the series transformer portion, which second secondary winding is connected, in series, to the first primary winding or the first secondary winding.

2. The series voltage regulating transformer of claim 1, wherein the first primary winding and the first secondary winding are connected in a self-coupling manner.

3. The series voltage regulating transformer of claim 1, wherein the series voltage regulating transformer further comprises a reactive compensation device, the reactive compensation device is connected, in series or parallel, to the voltage regulating winding or the second primary winding of the series transformer portion.

4. A transient impedance transformer, comprising:
a series voltage regulating transformer; and
an AC voltage regulating electronic switch,
wherein the series voltage regulating transformer comprises a main transformer portion including a first primary winding, a voltage regulating winding, and one or more first secondary windings, and
a series transformer portion including a second primary winding and one or more second secondary windings,
the AC voltage regulating electronic switch comprises one or a plurality of sub switches, each of which is an AC switch; and one or a plurality of voltage regulating power sources, every two of the sub switches are connected with each other by one of the voltage regulating power sources, respectively, wherein an output voltage of the AC voltage regulating electronic switch is controlled by a voltage regulated by the voltage regulating power source,
wherein, each of the first primary winding or the first secondary winding is connected, in series, to each of the second secondary windings, respectively, and the voltage regulating winding is connected to the second primary winding,
wherein an output voltage of the series voltage regulating transformer is equal to a voltage of the first primary winding or the first secondary winding of the main transformer portion plus or minus a voltage of the second secondary winding of the series transformer portion, which second secondary winding is connected, in series, to the first primary winding or the first secondary winding, and
wherein the AC voltage regulating electronic switch is connected to the voltage regulating winding or the second primary winding.

5. The transient impedance transformer of claim 4, wherein the first primary winding and the first secondary winding are connected in a self-coupling manner.

6. The transient impedance transformer of claim 4, wherein the AC switch is comprised of two semiconductor elements which are connected in anti-parallel.

7. The transient impedance transformer of claim 4, wherein the AC voltage regulating electronic switch further comprises a constant voltage power source,
wherein, a first terminal of the constant voltage power source is connected to an input terminal of the AC voltage regulating electronic switch, a second terminal of the constant voltage power source is connected to a circuit constituted by the sub switch and the voltage regulating power source, and the output terminal of the circuit constituted by the sub switch and the voltage regulating power source is connected to the output terminal of the AC voltage regulating electronic switch, and
wherein, the output voltage of the AC voltage regulating electronic switch is equal to a voltage of the constant voltage regulating power source plus or minus a voltage regulated by the voltage regulating power source.

8. The transient impedance transformer of claim 7, wherein, first terminals of each of the sub switches are connected with each other, second terminals of every two of the sub switches are connected with each other by one of the voltage regulating power sources, respectively, and a second terminal of the constant voltage power source is connected to a second terminal of a first sub switch among the plurality of sub switches.

9. The transient impedance transformer of claim 7, wherein the AC voltage regulating electronic switch further comprises another first sub switch and another second sub switch,
wherein first terminals of each of the sub switches are connected with each other, and second terminals of every two of the sub switches are connected with each other by one of the voltage regulating power sources, respectively,
wherein, a first terminal of the another first sub switch is connected to a second terminal of the first sub switch of the plurality of sub switches, and a second terminal of the another second sub switch is connected to a second terminal a last sub switch of the plurality of sub switches, and
wherein, a second terminal of the constant voltage power source is connected to a second terminal of the another first sub switch and a first terminal of the another second sub switch.

10. The transient impedance transformer of claim 7, wherein a second terminal of the constant voltage power source is connected to the second terminal of the first sub switch of the plurality of sub switches,
wherein, the plurality of sub switches include a first group of sub switches and a second group of sub switches, first terminals of each sub switch of the first group of sub switches are connected with each other, second terminals of every two of the first group of sub switches are connected by one of the voltage regulating power sources, respectively, first terminals of the second group of sub switches are connected with each other, and second terminals of every two of the second group of sub switches are connected by one of the voltage regulating power sources, respectively, and
wherein, a first terminal of the last sub switch of the first group of sub switches is connected to a second terminal of the first sub switch of the second group of sub switches.

11. The transient impedance transformer of claim 10, further comprising another constant voltage power source,
Wherein, a first terminal of the another constant voltage power source is connected to the first terminal of the last sub switch of the plurality of sub switches, and a second terminal of the another constant voltage power source is connected to the output terminal of the AC voltage regulating electronic switch.

12. The transient impedance transformer of claim 7, further comprising another constant voltage power source, wherein first terminals of each of the sub switches are connected with each other, and second terminals of every two of the sub switches are connected with each other by one of the voltage regulating power sources, respectively, wherein a second terminal of the constant voltage power source is connected to the first terminal of the first sub switch of the plurality of sub switches, and a first terminal of the another constant voltage power source is connected to the second terminal of the last sub switch of the plurality of sub switches, and wherein the second terminal of the another constant voltage power source is connected to the output terminal of the AC voltage regulating electronic switch.

13. The transient impedance transformer of claim 4, wherein the series voltage regulating transformer further comprises a reactive compensation device, the reactive compensation device is connected, in series or parallel, to the voltage regulating winding or the second primary winding of the series transformer portion.

\* \* \* \* \*